United States Patent [19]

Takahashi

[11] Patent Number: 5,574,901
[45] Date of Patent: Nov. 12, 1996

[54] METHOD AND APPARATUS FOR OBJECT TRAVERSING SUITABLE FOR STRUCTURED MEMORY FORMED BY LINKED OBJECTS

[75] Inventor: Toshinari Takahashi, Tokyo, Japan

[73] Assignee: Kabushiki Kaisha Toshiba, Kawasaki, Japan

[21] Appl. No.: 207,745

[22] Filed: Mar. 9, 1994

[30] Foreign Application Priority Data

Mar. 9, 1993 [JP] Japan .................................. 5-048159

[51] Int. Cl.$^6$ .............................. G06F 17/30; G06F 12/14
[52] U.S. Cl. ...................... 395/601; 395/490; 364/246.6; 364/282.1; 364/283.2; 364/286; 364/DIG. 1
[58] Field of Search .................................. 395/600, 490, 395/186; 364/246.6, 282.1, 283.2, 286, 286.5, 969, 969.4, 949.96, 918.7

[56] References Cited

U.S. PATENT DOCUMENTS

| | | | |
|---|---|---|---|
| 4,621,321 | 11/1986 | Boebert et al. | 395/600 |
| 4,956,769 | 9/1990 | Smith | 395/600 |
| 5,263,157 | 11/1993 | James | 395/600 |
| 5,335,346 | 8/1994 | Fabbio | 395/600 |
| 5,423,034 | 6/1995 | Cohen-Levy et al. | 395/600 |

OTHER PUBLICATIONS

*A Practical Guide to the Unix System*, Sobell, 1989, pp. 66–89, 214–216,270,366–371,380–381,446–447 and 516–531.

Cowart, *Mastering Windows™ 3.1 Special Edition*, 1992, 1993 pp. 909–914, Sybex Inc.

*Primary Examiner*—Thomas G. Black
*Assistant Examiner*—Jack M. Choules
*Attorney, Agent, or Firm*—Foley & Lardner

[57] ABSTRACT

An object traversing scheme in which the traverse procedure and the traverse rights can be specified flexibly. In this scheme, the object is stored with an assignment of a traverse right for each sub-object indicating who is allowed to traverse each sub-object; at least one traverse IDs for identifying a user making a request to make an access to the object are specified; the sub-objects to be traversed at a time of traversing the object in response to the request from the user identified by the traverse IDs are selected according to the traverse right assigned to the user identified by the traverse IDs in the object; and the selected sub-objects are outputted as a result of the access to the object. The traverse IDs for identifying the user can be changed according to the traverse rights of the sub-objects and the selection of the sub-objects. This scheme can be utilized very beneficially in conjunction with an electronic mail tool.

24 Claims, 21 Drawing Sheets

FIG. 1
PRIOR ART

| | | | 121 |
|---|---|---|---|
| 1211 — | OWNER ID | | 128 |
| 1212 — | GROUP ID | | 320 |

| | OWNER | | |
|---|---|---|---|
| 1213 — | RD | WR | EX |
| | 1 | 1 | 0 |

| | GROUP | | |
|---|---|---|---|
| 1214 — | RD | WR | EX |
| | 1 | 0 | 0 |

| | OTHER | | |
|---|---|---|---|
| 1215 — | RD | WR | EX |
| | 0 | 0 | 0 |

1216 —
| ITO | 〒345 | 0123−45−6789 |
|---|---|---|
| ⋮ | ⋮ | ⋮ |
| SATO | 〒456 | 03−9312−1234 |
| TAKAHASHI | 〒567 | 045−356−0012 |
| ⋮ | ⋮ | ⋮ |

FIG. 2
PRIOR ART

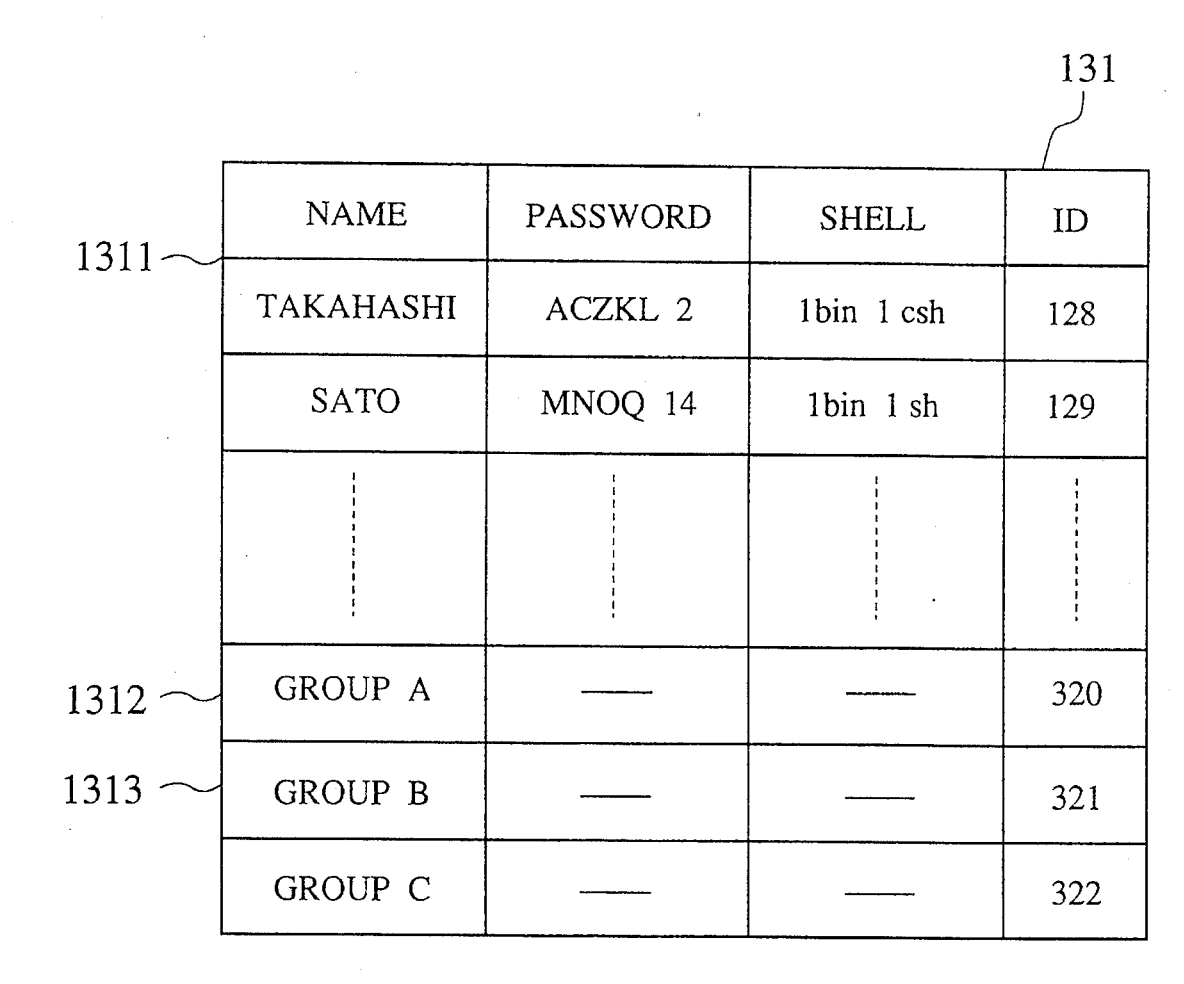

| | NAME | PASSWORD | SHELL | ID |
|---|---|---|---|---|
| 1311 | TAKAHASHI | ACZKL 2 | 1bin 1 csh | 128 |
| | SATO | MNOQ 14 | 1bin 1 sh | 129 |
| | ⋮ | ⋮ | ⋮ | ⋮ |
| 1312 | GROUP A | — | — | 320 |
| 1313 | GROUP B | — | — | 321 |
| | GROUP C | — | — | 322 |

| | | 141 |
|---|---|---|
| 1411 — OWNER ID | | 128 |
| 1412 — GROUP ID | | 320 |

1413 —
| OWNER | | |
|---|---|---|
| RD | WR | EX |
| 1 | 1 | 0 |

1414 —
| GROUP | | |
|---|---|---|
| RD | WR | EX |
| 0 | 0 | 0 |

1415 —
| OTHER | | |
|---|---|---|
| RD | WR | EX |
| 0 | 0 | 0 |

1416 — Mr. SATO PLANS TO MOVE OUT IN AUGUST. NEED TO RE-CONFIRM IT AROUND THAT TIME. Mr. SATO'S DIRECT PHONE NUMBER 0123-45-6800 SHOULD NOT BE LISTED IN THE DIRECTORY AS IT IS SECRET.

FIG. 4
PRIOR ART

| | | | 151 |
|---|---|---|---|
| 1511 — OBJECT NAME | "GROUP A DIRECTORY" | | |
| 1512 — OWNER | ID | 128 | |
| 1513 — GROUP | ID | 320 | |
| 1514 — RD | WR | EX | |
| 1 | 0 | 0 | |
| 1515 — RD | WR | EX | |
| 1 | 0 | 0 | |
| 1516 — RD | WR | EX | |
| 1 | 0 | 0 | |
| 1517 — SUB − OBJECT | 1 | NUMBER OF SUB−OBJECTS | 2 |
| 1519 — SUB − OBJECT | No. 1−ID | 50 | 1518 |
| 1520 — SUB − OBJECT | No. 2−ID | 52 | |

FIG. 5
PRIOR ART

| | | 161 |
|---|---|---|
| 1611 — SET ACCESS ID | | — |
| 1613 — OWNER ID | | 129 |
| 1614 — GROUP ID | | 320 |

| OWNER | | |
|---|---|---|
| RD | WR | EX |
| 1 | 1 | 1 |

1615 —

| GROUP | | |
|---|---|---|
| RD | WR | EX |
| 0 | 0 | 1 |

1616 —

| OTHER | | |
|---|---|---|
| RD | WR | EX |
| 0 | 0 | 0 |

1617 —

EXECUTION PROGRAM

| | | 171 |
|---|---|---|
| 1612 — SET ACCESS ID | | 320 |
| 1613 — OWNER ID | | 129 |
| 1614 — GROUP ID | | 320 |

1615 —
| OWNER | | |
|---|---|---|
| RD | WR | EX |
| 1 | 1 | 1 |

1616 —
| GROUP | | |
|---|---|---|
| RD | WR | EX |
| 0 | 0 | 1 |

1617 —
| OTHER | | |
|---|---|---|
| RD | WR | EX |
| 0 | 0 | 0 |

1619 — EXECUTION PROGRAM

FIG. 9

| | | | |
|---|---|---|---|
| OBJECT | ID | #IDM | 301 |
| CREATOR | ID | 128 | 302 |
| ACCESS RIGHT | | •—(1) | 303 |
| TRAVERSE INFO | | EVERYTHING | 307 |
| NUMBER OF SUB-OBJECTS | | 3 | 308 |
| SUB-OBJECT No.1 | ID | #IDGA | 309 |
| | TRAVERSE RIGHT | •—(2) | 310 |
| SUB-OBJECT No.2 | ID | #IDGB | 309 |
| | TRAVERSE RIGHT | •—(3) | 310 |
| SUB-OBJECT No.3 | ID | #IDGC | 309 |
| | TRAVERSE RIGHT | •—(4) | 310 |

210

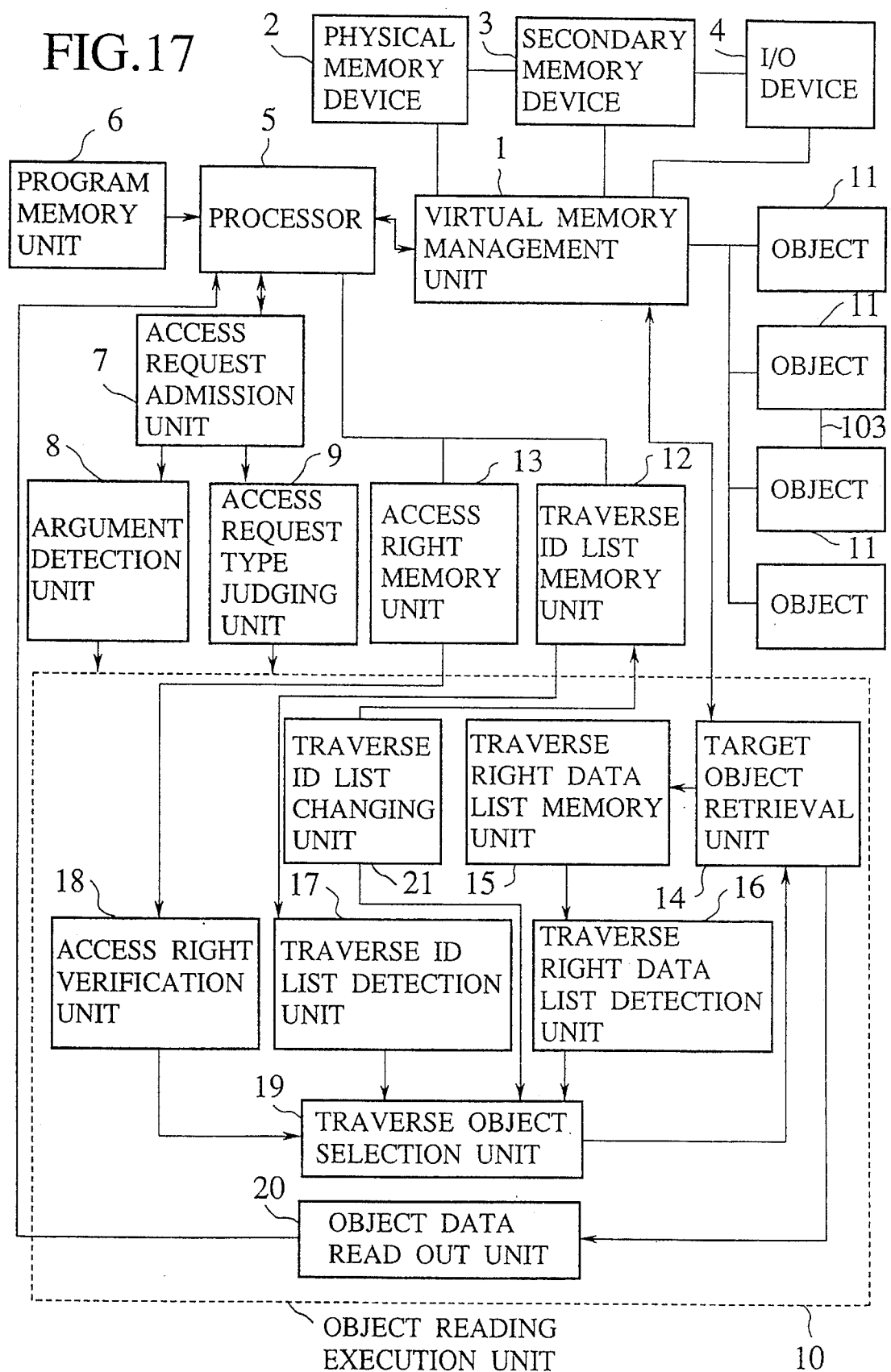

METHOD AND APPARATUS FOR OBJECT TRAVERSING SUITABLE FOR STRUCTURED MEMORY FORMED BY LINKED OBJECTS

BACKGROUND OF THE INVENTION

1. Field of the Invention

The present invention relates to an object traversing over a structured memory formed by linked objects such as a data file system, a virtual memory space, and a database system utilized in computers.

Here, it is to be noted first that the term "object" used in this specification represents any collection of data, including not just data flies and programs but also various structures for operations to be temporarily utilized in a course of executing programs.

Also, a plurality of objects may be related with each other by links, and can be treated together as another object. In a case of regarding a plurality of objects together as a single object, each object constituting that single object may be referred as sub-objects.

2. Description of the Background Art

Conventionally known schemes for the object traversing over a plurality of linked objects include a scheme for sequentially tracing the links as in a hyper-text system, and a scheme for retrieving and presenting a relevant object group for a specified name as in a data file system for a computer. In addition, a scheme for limiting accessible objects depending on users and a scheme for temporarily changing an access right are also known.

Furthermore, it is also known to be possible to generally represent accessible objects and to read out a plurality of linked objects as a continuous data, by combining these schemes.

On the other hand, there is a recent attempt to combine these conventionally known schemes in which, at a time of constructing a large object by hierarchically combining a plurality of objects, an access right data is given to each sub-object and a procedure for making an access is changed by varying parameters, in order to represent a single combined object to appear as a number of different types of combined objects. This idea will now be described in further detail.

Here, an exemplary situation in which Mr. Takahashi is producing a directory file for members belonging to a certain group A will be considered as an illustrative example.

FIG. 1 shows a state in which the directory is produced by Mr. Takahashi as an object 121. In this FIG. 1, no file name is assigned to this directory file, but the file name may be assigned at this point if desired.

In this object 121 of FIG. 1, a field 1211 indicates an owner ID for an owner of this object 121, where a number "128" registered in this owner ID field 1211 represents Mr. Takahashi in this example as indicated in an entry 1311 on an ID table 131 shown in FIG. 2, while a field 1212 indicates a group ID for a group to which this object 121 belongs, where a number "320" registered in this group ID field 1212 represents the group A in this example as indicated in an entry 1312 on the ID table 131 shown in FIG. 2.

A field 1213 indicates the access rights assigned to the owner of this object 121, where RD, WR, and EX fields indicate the access rights for reading, writing, and execution, respectively. In this case, this object 121 is data and not program, so it cannot be executed and therefore the EX field has a value "0", while the owner of this object 121 certainly can read or write this object 121, so that the RD and WR fields have values "1".

A field 1214 indicates the access rights for this object 121 with respect to the members of the group A. In this case, this object 121 is certainly readable for the members of the group A as it is the data concerning this group A, so that the RD field has a value "1", but the WR field has a value "0" in order to protect the data of this object 121, while the EX field has a value "0" for the same reason as in the field 1213.

A field 1215 indicates the access rights for this object 121 with respect to those not belonging to the group A (non-members). In this case, the directory of the group is a secret matter which should not be disclosed to the non-members, so that the RD field has a value "0", while the WR and EX fields have the values "0" for the same reason as in the field 1214.

A field 1216 indicates the actual data of the directory. Here, instead of registering the actual data themselves in this field 1216, a pointer to the data or a block ID of a memory block storing the data may be registered, if desired.

Next, for the purpose of managing this directory file of FIG. 1, an object 141 shown in FIG. 3 for registering comments is produced by Mr. Takahashi.

In this object 141 of FIG. 3, a field 1411 indicates the owner ID for Mr. Takahashi in this example, and a field 1412 indicates a group ID for a group to which this object 141 belongs, where a number "320" registered for this group ID 1412 represents the group A in this example as indicated in an entry 1312 on the ID table 131 shown in FIG. 2.

A field 1413 indicates the access rights assigned to the owner of this object 141 similar to the field 1213 in FIG. 1. Fields 1414 and 1415 indicate the access rights for this object 141 with respect to the members and the non-members of the group A, respectively. In this case, the comments of this object 141 are not to be seen by the members as well as by the non-members of the group A, so that all the fields including the RD fields have values "0" in these fields 1414 and 1415. A field 1416 indicates the actual comments of this object 141.

Here, the assignment of the different access rights for different objects as in the case of the objects 121 and 141 of this example has been well known conventionally. The above noted recent attempt is further aimed at treating these plurality of objects as if they are just a one file by producing another object 151 shown in FIG. 4, which relates the object 121 with the object 141 and represents a single combined object for these objects 121 and 141.

In this object 151 of FIG. 4, a field 1511 indicates an object name which corresponds to a file name in a usual data file system and which is "group A directory" in this example. Fields 1512 and 1513 are the owner ID and the group ID similar to the fields 1411 and 1412 in FIG. 3.

A field 1514 indicates the access rights assigned to the owner of this object 151 similar to the field 1413 in FIG. 3 except that the WR field has a value "0" because there is no need to alter the structure of this object 151 itself even when the data and the comments for the directory are changed in future. Fields 1515 and 1516 indicate the access rights for this object 151 with respect to the members and the non-members of the group A, respectively. In this case, there is no reason to hide the fact that this file "group A directory" comprises the directory itself and the comments from anybody, so that the RD fields have values "1" in these fields 1515 and 1516.

A field 1517 is a bit indicating a presence or absence of sub-objects, which has a value "1" in this example as there are sub-objects, while a field 1518 indicates a number of sub-objects which is indicated as 2 in this example. Fields 1519 and 1520 indicate IDs of these two sub-objects, which are the IDs of the sub-objects 121 and 141, respectively, in this example.

By constructing these objects 121, 141, and 151 as described above, when Mr. Takahashi (ID: "128") reads the object 151 representing the file "group A directory", it is possible to learn that there are the sub-object 121 registering the directory itself and the sub-object 141 registering the comments, and Mr. Takahashi can make accesses to these sub-objects 121 and 141 as he has assigned the access rights for them. On the other hand, when any member of the group A (ID: "320") reads this object 151 named "group A directory", the content of the sub-object 121 registering the directory itself can be read, but the content of the sub-object 141 registering the comments cannot be read as there is no access right for this sub-object 141 assigned to the members of the group A.

Here, the access right for reading this object 151 is also assigned to the non-members as well, so that any non-member can also traverse over the sub-objects 121 and 141 by tracing the links from this object 151, but the access rights for reading these sub-objects 121 and 141 are not assigned to the non-members, so that the contents of these sub-objects 121 and 141 cannot be read by any non-member and therefore the secrecy of the directory can be maintained.

In this manner, it becomes possible to make all or a part of the objects to be accessible depending on the users. However, in the manner described above, it is impossible to realize more flexible representations in which the file "group A directory" appears as one file having comments for Mr. Takahashi, while this same file appears as a simple file without comments for the members of the group A.

Even when such more flexible representations are realizable somehow, the following problem still remains to be resolved.

Namely, suppose there is a program capable of printing the data of the directory by formatting it in an appropriate table format, which is programmed without knowing a presence of the comments attached to the directory. When this program is made to be available to the members of the group A and Mr. Takahashi executes this program, since Mr. Takahashi has the access rights for not only the directory itself but also for the comments which are not required by the program itself, the comments are going to be read out along with the directory itself such that this program may not operate properly because of the presence of the unexpected data. That is, even when Mr. Takahashi tries to read the "group A directory" file by using the access right assigned to the members of the group A, because of the stronger access rights assigned to Mr. Takahashi, the reading operation is going to be carried out for all the objects for which Mr. Takahashi has the access rights.

One of the widely used solutions to this type of a problematic situation has been the so called SUID (Set User Identification) scheme, disclosed in U.S. Pat. No. 4,135,240, which changes the access rights at a time of the execution of the program. Actually, this SUID scheme is intended for changing the rights assigned to the owner ID, so that it is not going to be applicable to above problem straightforwardly, but this SUID scheme can be modified in order to resolve the above problem as follows.

Namely, FIG. 5 shows an object 161 registering a usual program for directory formatting, while FIG. 6 shows a modified object 171 registering the similar program for directory formatting, where the identical fields of these objects 161 and 171 are given the identical reference numerals in FIGS. 5 and 6.

In this object 161 of FIG. 5, a SAID (Set Address ID) 1611 is unspecified, which implies that the program registered in this object 161 is going to operate in a normal manner. Fields 1613 and 1614 are the owner ID and the group ID similar to the fields 1411 and 1412 in FIG. 3. Fields 1615, 1616, and 1617 indicate the access rights for the owner, the member of the group A, and the non-members, respectively, where the execution right is limited to the owner and the member of the group A, while the reading and writing rights are limited only to the owner. A field 1618 registers the execution program itself which uses the object 151 of FIG. 4 as the data.

When this execution program 1618 is executed by any member of the group A other than Mr. Takahashi, the expected result can be obtained, but when this execution program 1618 is executed by Mr. Takahashi, the proper operation of the program may not be obtained as the unexpected data of the object 141 are also read out along with the expected data of the object 121.

In contrast, the modified object 171 of FIG. 6 differs from the object 161 of FIG. 5 in that a SAID 1612 has an ID "320" of the group A. As a result, when this object 171 is executed by Mr. Takahashi, the original access rights assigned to Mr. Takahashi as an executor of this program are abandoned, and only the rights assigned to the group A indicated by this ID "320" registered for the SAID 1612 become available to Mr. Takahashi.

This object 171 has the execution program 1619 in which the object 151 and the sub-objects 121 and 141 are going to be accessed by using the access rights assigned to the group A, so that the same data are going to be accessible regardless of who is executing this program, and the expected result can be obtained from this program 1619 by any member of the group A including Mr. Takahashi.

Thus, the above described conventional scheme can realize the object traversing using a special access right for relating the program with the data to be used by the program, but in this conventional scheme, the right to attach the SAID to the program remains uncertain. Namely, if the SAID can be attached to the program very easily, it is going to be possible to obtain the optional access rights as a result of using this program, such that the access rights attributed to each object become meaningless.

For this reason, it is necessary to manage the right to attach the SAID to the program by some other means, but there has been no effective solution to this problem conventionally, and this right to attach the SAID to the program has been assigned only to the privileged user called root.

This assignment of the right to attach the SAID to the program only to the privileged user is a severe constraint because the right to set up the access rights for the object should be given to the owner of that object in principle. Moreover, in this assignment, the access rights which should have been attributed to the objects themselves are going to be controlled only by the setting of the program which is unrelated to the objects themselves, so that it is a highly inconvenient constraint which cannot really realize the protection mechanism expected for the objects.

As described, in the conventionally available schemes, only the access rights are available for conditioning the object traversing, so that it has been difficult to change the manner of object traversing according to different manners of utilizing the objects, and it has been impossible to specify the appropriate manner of object traversing in each object itself.

Furthermore, even in a case of making an access to a group of objects as a whole by regarding them as a single file, as long as only the access rights are used, it has been impossible to specify what manners of accesses are actually going to be made in the objects themselves.

SUMMARY OF THE INVENTION

It is therefore an object of the present invention to provide an object traversing scheme in which the traverse procedure and the traverse rights can be specified flexibly in each object produced by a general user, independently from the operation of the application program.

According to one aspect of the present invention there is provided an object traversing apparatus for traversing an object formed by a plurality of sub-objects, comprising: memory means for storing the object with an assignment of a traverse right for each sub-object indicating who is allowed to traverse each sub-object; traverse ID list means for specifying at least one traverse IDs for identifying a user making a request to make an access to the object; traverse object selection means for selecting the sub-objects to be traversed at a time of traversing the object in response to the request from the user identified by the traverse IDs according to the traverse right assigned to the user identified by the traverse IDs in the object; and output means for outputting the sub-objects selected by the traverse object selection means as a result of the access to the object.

According to another aspect of the present invention there is provided a method of object traversing for traversing an object formed by a plurality of sub-objects, comprising the steps of: storing the object with an assignment of a traverse right for each sub-object indicating who is allowed to traverse each sub-object; specifying at least one traverse IDs for identifying a user making a request to make an access to the object; selecting the sub-objects to be traversed at a time of traversing the object in response to the request from the user identified by the traverse IDs according to the traverse right assigned to the user identified by the traverse IDs in the object; and outputting the sub-objects selected at the selecting step as a result of the access to the object.

Other features and advantages of the present invention will become apparent from the following description taken in conjunction with the accompanying drawings.

BRIEF DESCRIPTION OF THE DRAWINGS

FIG. 1 is a diagram of an object representing a directory in an exemplary conventional case.

FIG. 2 is a diagram of an ID list used in the exemplary conventional case.

FIG. 3 is a diagram of an object representing comments for the directory of FIG. 1 in the exemplary conventional case.

FIG. 4 is a diagram of an object for relating objects of FIGS. 1 and 3 in the exemplary conventional case.

FIG. 5 is a diagram of an object for registering a program in the exemplary conventional case.

FIG. 6 is a diagram of a modified object for registering a program in the exemplary conventional case.

FIG. 9 is a diagram of a data structure for one object in the exemplary linked object structure of FIG. 8.

FIG. 17 is a block diagram of a second embodiment of an object traversing apparatus according to the present invention.

DETAILED DESCRIPTION OF THE PREFERRED EMBODIMENTS

Figure 7:
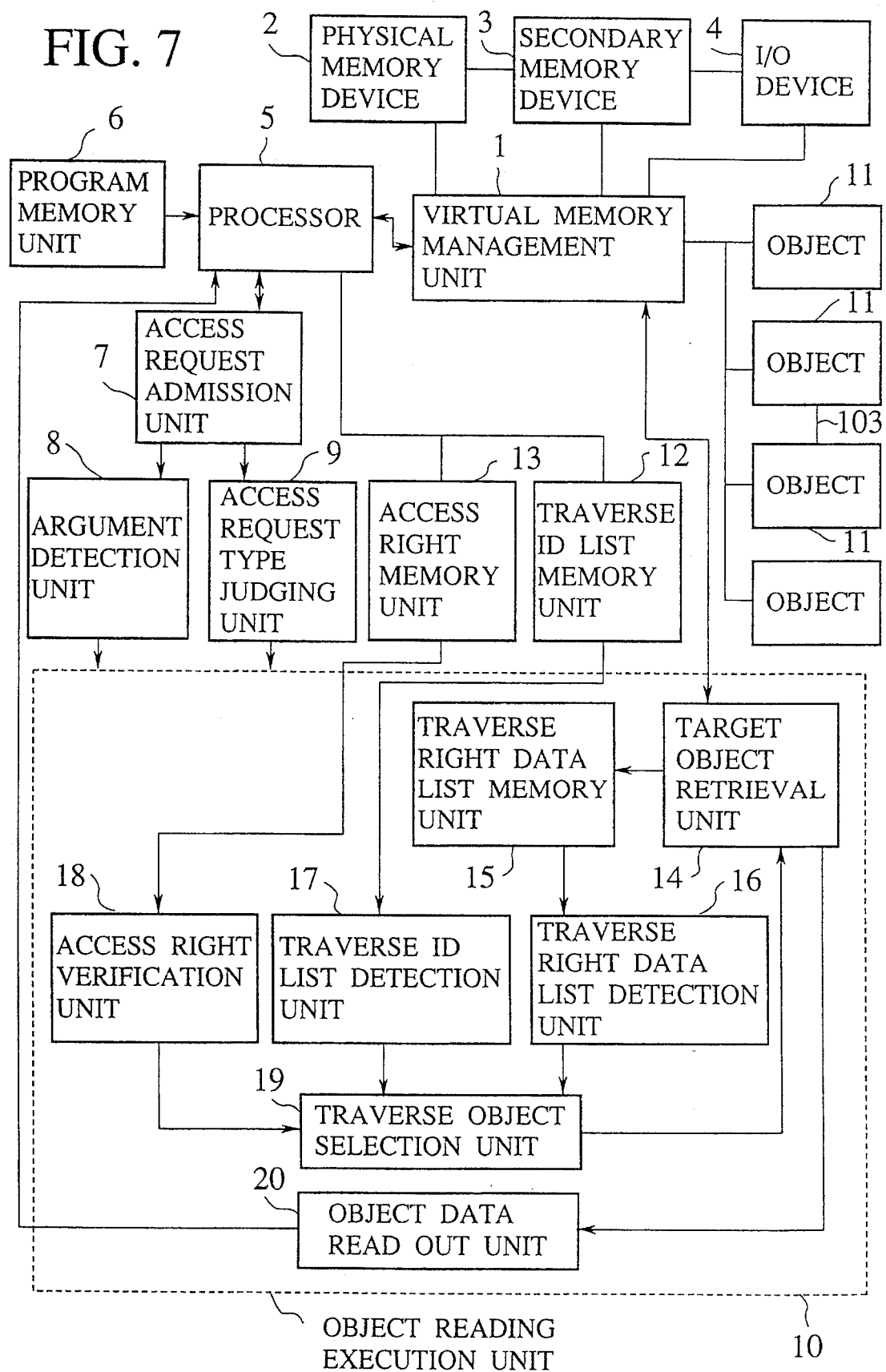
FIG. 7 is a block diagram of a first embodiment of an object traversing apparatus according to the present invention.

Referring now to FIG. 7, the first embodiment of the method and the apparatus for object transversing according to the present invention will be described in detail.

FIG. 7 shows an overall configuration of an object traversing apparatus of this first embodiment, which comprises the following elements.

A virtual memory management unit 1 is a manager for making the management of inputs and outputs to and from memory devices easier. Here, the virtual memory management unit 1 manages objects 11 which are virtually stored in a virtual memory space of this apparatus, although it is not essential for the present invention to have these objects 11 to be virtually stored and any known memory management scheme may be employed instead. Also, the objects 11 may include those which are related with each other by a link 103.

The object data managed by this virtual memory management unit 1 are actually stored in a physical memory device 2 or a secondary memory device 3 such as a hard disk drive, a CD-ROM, or an IC card. Here, the object data can be stored into the secondary memory device 3 in a case of storing the data semi-permanently as persistent objects, as well as in a case of utilizing the secondary memory device 3 as a swapping region for the physical memory device 2. The secondary memory device 3 may also be utilized in a case of carrying the object data away from this apparatus. It is also possible to construct the physical memory device 2 hierarchically by using cache memories or other means in a generally known manner.

The virtual memory management unit 1 is also connected with an I/O device 4 which is utilized in a case of treating the object data not actually stored in this apparatus and transmitted through telephone transmission line, radio, or network, as if they are always present in a virtual memory space of this apparatus. This can be realized by a generally known manner for managing a single virtual memory.

A processor 5 executes programs stored in a program memory unit 6 to carry out appropriate data processing on the object data managed by the virtual memory management unit 1. This processor 5 contains usual processor elements such as registers to be utilized temporarily during the execution of the instructions, a program counter for indicating a position of the currently executed instruction in the program memory unit 6, a stack pointer for indicating a top position of stack data, etc., such that the processor 5 can execute the programs by manipulating data in these processor elements, while requesting the reading and writing of necessary data with respect to the virtual memory management unit 1.

An access request admission unit 7 admits access requests from the processor 5, including various data processing requests such as those for data reading, data writing, and data cancelling. An argument detection unit 8 detects the arguments of each access request admitted by the access request admission unit 7, while an access request type judging unit 9 judges an access type of each access request admitted by the access request admission unit 7. Then, in a case the admitted access request is judged as a request for object reading by the access type judging unit 9, the admitted request is transmitted to an object reading execution unit 10 to be described in detail below along with the arguments detected by the argument detection unit 8.

A traverse ID list memory unit 12 manages a traverse ID list to be described in detail below, which may be provided for each thread, or shared among a plurality of threads. Similarly, an access right memory unit 13 manages access rights for the objects 11 with respect to users.

It is to be noted here that each of the elements of this apparatus described above may be provided with a specific server for managing it, if desired.

In the object reading execution unit 10, a target object retrieval unit 14 commands the reading of a target object specified by the object reading request from the virtual memory management unit 1, and stores the traverse right data list for this target object which is contained in the object data for this target object managed by the virtual memory management unit 1 into a traverse right data list memory unit 15, while supplying the retrieved target object to an object read out unit 20.

A traverse right data list detection unit 16 acquires the traverse right data list for the target object from the traverse right data list memory unit 15, and supplies it to a traverse object selection unit 19.

A traverse ID list detection unit 17 acquires a traverse ID list concerning a currently accessed process from the traverse ID list memory unit 12, while an access right verification unit 18 verifies whether the access rights for the target object are assigned to the currently accessed process or not according to the information stored in the access right memory unit 13.

The traverse object selection unit 19 judges appropriate objects to be traversed according to the information supplied from the traverse right data list detection unit 16, the traverse ID list detection unit 17, and the access right verification unit 18, by the procedure to be described in detail below, while also requesting the retrieval of additionally necessary objects to the target object retrieval unit 14.

The object read out unit 20 obtains necessary portions of the object data, i.e., data for all the sub-objects actually traversed, which are acquired by the recurrent operations of the elements of this object reading execution unit 10 and reads out these data to the processor 5 as a response to the object reading request.

Figure 8:
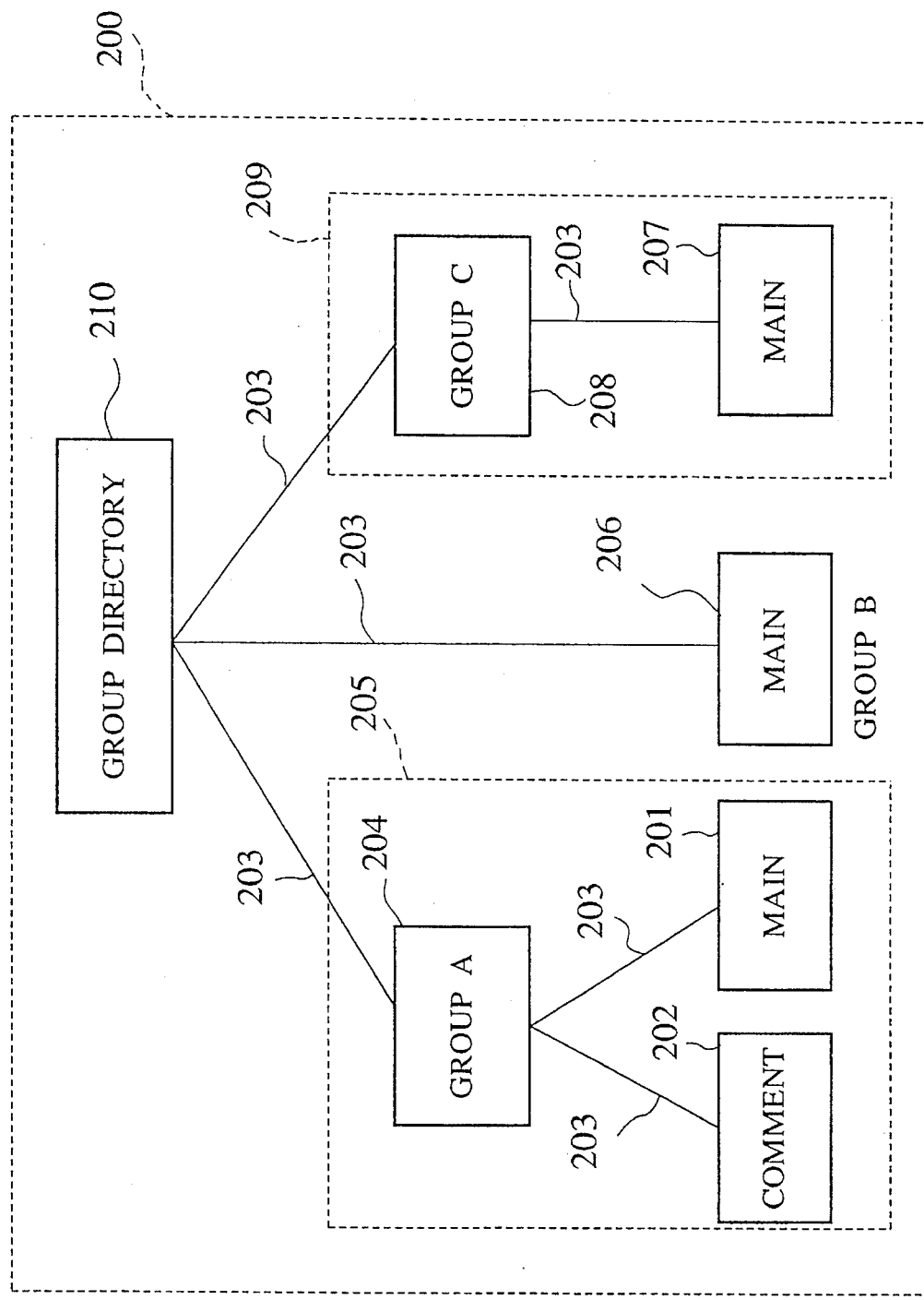
FIG. 8 is a diagram of an exemplary linked object structure handled by the apparatus of FIG. 7.

Now, FIG. 8 shows an exemplary object structure in this first embodiment in which a plurality of objects are related by links to form one meaningful file.

In this case, an object 201 representing a directory of a group A itself is accompanied by an object 202 representing comments attached to the directory of the object 201 by a directory creator. These two objects 201 and 202 are linked to a combined object 204 representing a group A directory by links 203 such that a set of these objects 201, 202, and 204 and the links 203 can be regarded as the group A directory 205 as a whole.

On the other hand, a directory of a group B has no comment attached, so that an object 206 representing the directory of the group B itself alone is going to be an entire group B directory.

Similarly, a directory of a group C also has no comment attached so that it may be represented by a structure similar to the directory of the group B, but here an object 207 representing a directory of the group C itself is linked to a combined object 208 representing a group C directory by a link 203 such that a set of these objects 207 and 208 and the link 203 can be regarded as the group C directory 209 as a whole, in anticipation of a possibility for adding comments later on.

The object 204 for the group A directory, the object 206 for the group B directory, and the object 208 for the group C directory are also linked to an object 210 representing a group directory in general by links 203 such that a set of these objects 205, 206, 209, and 210 and all the links 203 can be regarded as a generic notion of a group directory 200 as a whole.

These objects are assigned with uniquely identifiable IDs, and the ID for the object 210 is set to be IDM, the IDs for the objects 204, 206, and 208 are set to be IDGA, IDGB, and IDGC, respectively, the IDs for the objects 201 and 207 are set to be IDGA0 and IDGC0, respectively, and the ID for the object 202 is set to be IDGAC, in a concrete example described below.

The object 210 for the group directory has a data structure as shown in FIG. 9, which includes the following fields.

A field 301 indicates an object ID of this object 210, while a field 302 indicates an ID of a creator of this object 210.

This ID of the creator corresponds to an ID of an owner in a conventional data file system, but it is not limited to a user ID and can be given by a group ID, a program number, or a thread number, if desired.

A field 303 indicates an access right data list which defines those who have the access rights for this object 210, which is in a form of a list of data in general. In this example, the access right data list is given in a form shown in FIG. 10 which includes three access right data 304, 305, and 306.

Here, the creator of this object 210 has the access rights for reading and writing, but the access right for execution is not going to be given yet, so that the access right data 304 for the creator (ID "128") has flags "R" and "W" for indicating the assignment of reading and writing access rights. Similarly, the access right data 305 has a flag "R" for indicating the assignment of reading access right to those who have the group ID "320" to "322", while the access right data 306 has a flag "R" for indicating the assignment of reading access right to a particular program identified by "program-ID". This access right data 306 indicates that the reading access right is assigned to the program having this "program-ID" provided that the execution result of this program is true.

Figure 10:
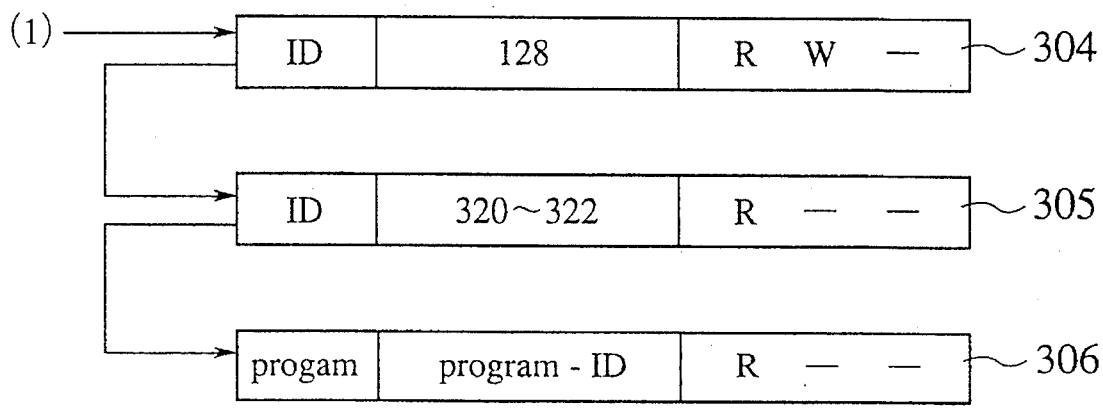
FIG. 10 is a diagram of the access right data in the data structure of FIG. 9.

It is to be noted here that by assigning the uniquely identifiable IDs similar to the user IDs to the programs and threads in addition to the users and groups, it becomes unnecessary to provide a leftmost field indicating "ID" or "program" in FIG. 10.

Thus, in this example, the access to this object 210 is allowed only when the assignment of the access right is indicated by one of these three access right data 304, 305, and 306. This is a simplest example and more complicated access rights can be defined by logically combining these access rights.

A field 307 indicates a traverse information for this object 210, which defines how to traverse over sub-objects at a time of traversing this object 210. In general, any desired manner of traversing can be realized by setting a program ID of an appropriate traverse control program to this traverse information field 307. Here, only some typical examples of such a traverse control program will be described.

A flag "EVERYTHING" set to the field 307 in FIG. 9 indicates that all the traversable sub-objects should be traversed. Namely, all the sub-objects for which the traverse rights are given will be sequentially read out in response to this flag. This flag is provided such that those who belong to a plurality of groups can read a plurality of group directories for a plurality of groups to which they belong. In a case there is no traversable sub-object, this flag is going to cause an error called "permission denied". In this regard, it is also possible to replace this flag by another flag "EVERYTHING-SILENT" which shows a content of the group directory as an empty file when there is no traversable sub-object, without causing an error. Except for this aspect concerning the error, "EVERYTHING" and "EVERYTHING-SILENT" are identical, so that they are not explicitly distinguished in the following. Also, the explanation of the error handling operation required in a case of using "EVERYTHING" is omitted as it is already known and not essential to the present invention.

As another example of a traverse control program, a flag "ONLYONE" may be used such that only one traversable sub-object is traversed while all the other traversable sub-objects are ignored even if they exist. This flag also causes an error when there is no traversable sub-object. In this regard, it is also possible to avoid the occurrence of an error by replacing this flag by another flag "ONLYONE-SILENT", just as in a case of the flag "EVERYTHING" described above.

A field 308 indicates a number of sub-objects for this object 210, which is set to be 3 in this example as there are three sub-objects 204, 206, and 208 for the object 210. These three sub-objects are identified by the IDs registered in fields 309, and each sub-object ID field 309 is accompanied by a field 310 for indicating a traverse right data list.

Figure 11:
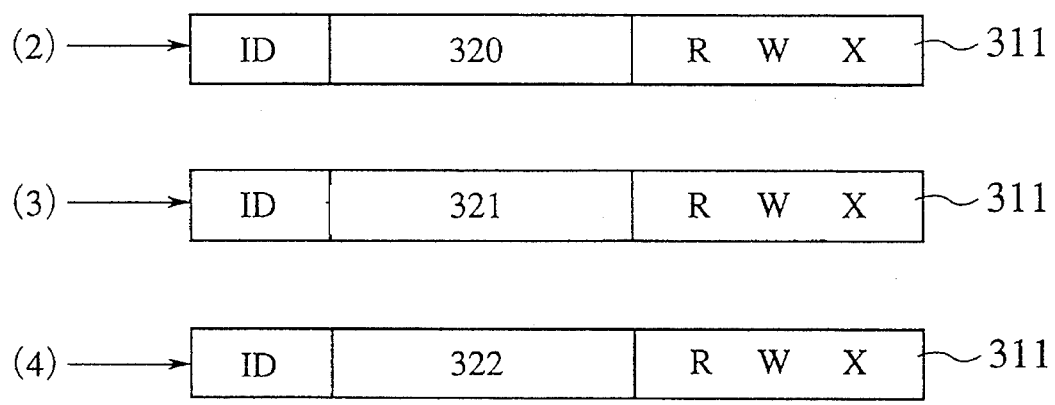
FIG. 11 is a diagram of the traverse right data in the data structure of FIG. 9.

In this example, the traverse right data lists for the sub-objects Nos. 1 to 3 are given as traverse data 311 in forms shown in FIG. 11, each of which contains only one element alone. According to these traverse data 311 of FIG. 11, the traverse rights for the sub-object No. 1 are exclusively assigned to the members of the group A identified by the group ID 320, the traverse rights for the sub-object No. 2 are exclusively assigned to the members of the group B identified by the group ID 321, and the traverse rights for the sub-object No. 3 are exclusively assigned to the members of the group C identified by the group ID 322. In each traverse data 311, flags "R", "W", and "X" indicates the assignment of the traverse rights for object traversing in conjunction with reading, writing, and execution of this object 210, respectively, and in this example, the full traverse rights including all these traverse rights are given to the members of the respective groups.

Here, the traverse rights specified by the traverse right data list 310 are functionally different from the access rights specified by the access right data list 303 as follows. Namely, each access right for an object indicates whether it is possible to make an access to that object or not, whereas each traverse right for a sub-object indicates whether that sub-object should be traversed automatically. For example, in a case the access right is given but the traverse right is not given for a certain sub-object, when the object having that certain sub-object as one of its sub-objects is straightforwardly traversed, that certain sub-object is not going to be traversed, i.e., that certain sub-object remains invisible from the user such that its presence can be concealed from the user because the traverse right is not assigned, whereas when the access to that certain sub-object is made by explicitly specifying that certain sub-object, that certain sub-object is accessible because the access right is assigned.

It is to be noted that the inclusion of the flag "W" for writing in the traverse right data 311 for all the members of the group may seem strange from a sense of the ordinary access right mechanism. However, this traverse right only indicates a procedure for traversing as described above, and it has nothing to do with the protection of the objects which is achieved by means of the access rights. Consequently, even when someone tries to actually rewrite the data of the directory by abusing this "W" flag in the traverse right data 311, it is impossible to rewrite the data as long as no access right for writing is assigned.

Here, the presence or absence of this flag "W" in the traverse right data 311 should not be considered as meaningless, because if this flag "W" is absent, the writing becomes impossible simply because it becomes impossible to reach to the sub-object itself by the traversing of the object, whereas when this flag "W" is present, it is possible to reach to the sub-object to check the access rights of the sub-object, and carry out an appropriate error processing.

Figure 12:
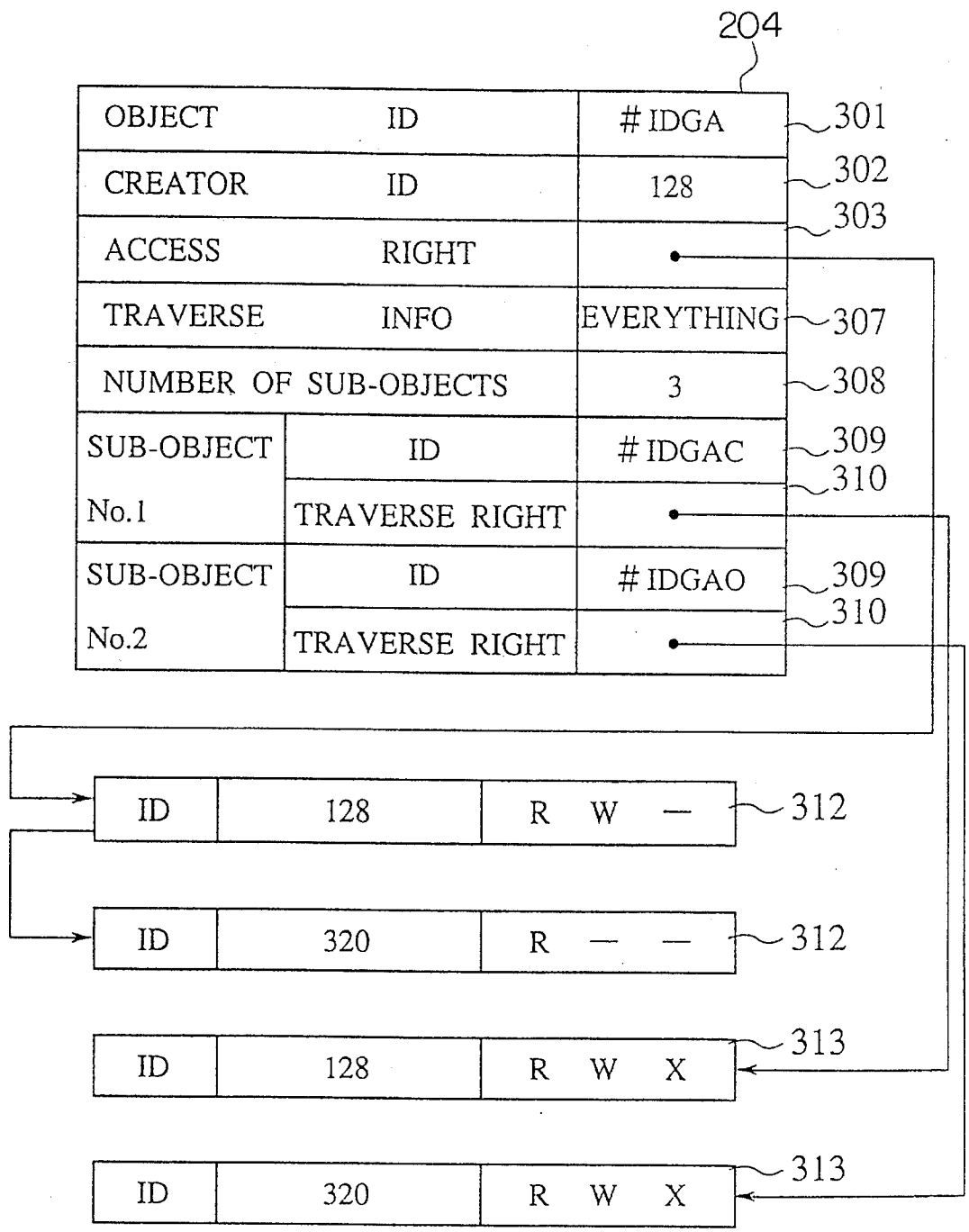
FIG. 12 is a diagram of one sub-object of the object whose data structure is shown in FIG. 9.

On the other hand, the object 204 for the group A directory has a data structure as shown in FIG. 12. Here, those fields which are similar to the corresponding fields in the object 210 described above will be given the same reference numerals In the figure and their descriptions will be omitted. Also, the object 206 for the group B directory and the object 208 for the group C directory have the similar structure as this object 204 so that their descriptions will be omitted.

In this object 204, the access right data list field 303 has two access right data 312 indicating that the creator (ID: "128") has the access rights for reading and writing, while the members of the group A (ID: "320") has the access right for reading alone.

Also, the sub-object No. 1 is Identified by the registered ID as the object 202 for the comments, while the sub-object No. 2 is identified by the registered ID as the object 201 for the directory itself. In addition, these sub-objects have the traverse right data list fields 310 which contain the traverse data 313 indicating the full traverse rights for the creator (ID: "128") and the members of the group A (ID: "320"), respectively.

Now, using this concrete example described above, the actual procedure of the object traversing in various cases will be described in detail.

First, before the object traversing, the traverse ID list is set up in the traverse ID list memory unit 12. Here, the user can set any desired number of traverse IDs to the traverse ID list. However, the traverse rights for the IDs to which the user himself does not belong are usually meaningless to the user, so that all the IDs to which the user himself currently belongs are usually set as a default setting.

Figure 13:
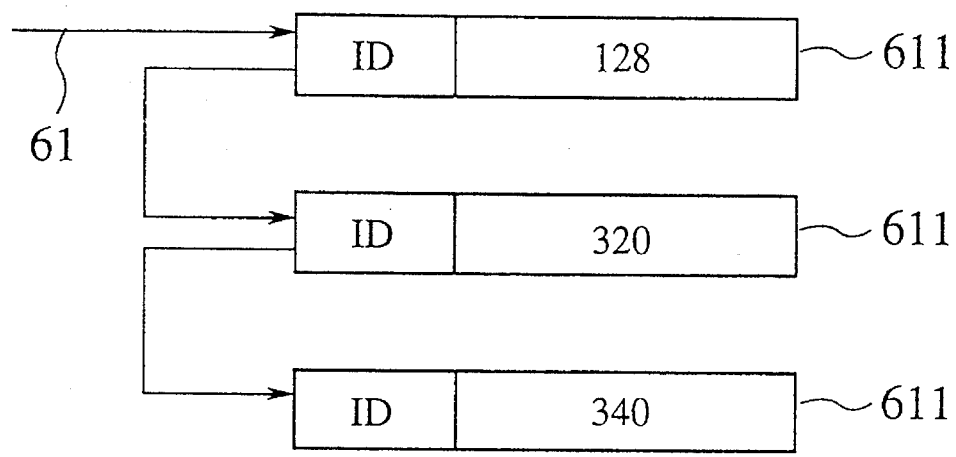
FIG. 13 is a diagram of an exemplary initial setting of the traverse ID list for one user (creator) in the apparatus of FIG. 7.

For example, when the user with the ID: "128" belongs to the group A with the group ID: "320" as well as to another group with the group ID: "340", the initial setting 61 of the traverse ID list has three traverse IDs 611 as shown in FIG. 13. It is of course possible to set any other setting as the initial setting of the traverse ID list, if desired.

In this state, when the object traversing of the object 204 for the group A directory is started, since the access right is assigned to this user (ID: "128") in the access right data list field 303, so that this object 204 can be accessed. Then, whether the sub-object No. 1 of this object 204 can be traversed or not is checked. In this case, the traverse right for reading is assigned to the ID "128" of this user according to the traverse right data 313 registered in the traverse right data list field 310 which matches with one of the traverse IDs 611 in the traverse ID list, so that the sub-object No. 1 of the object 204 is going to be traversed.

Then, as the traverse information field 307 has the flag "EVERYTHING", it proceeds to traverse the next sub-object No. 2 of this object 204. In this case, the traverse right for reading Is assigned to the ID "320" to which this user belongs according to the traverse right data 313 registered in the traverse right data list field 310, so that the sub-object No. 2 of this object 204 is also going to be traversed.

Figure 14:
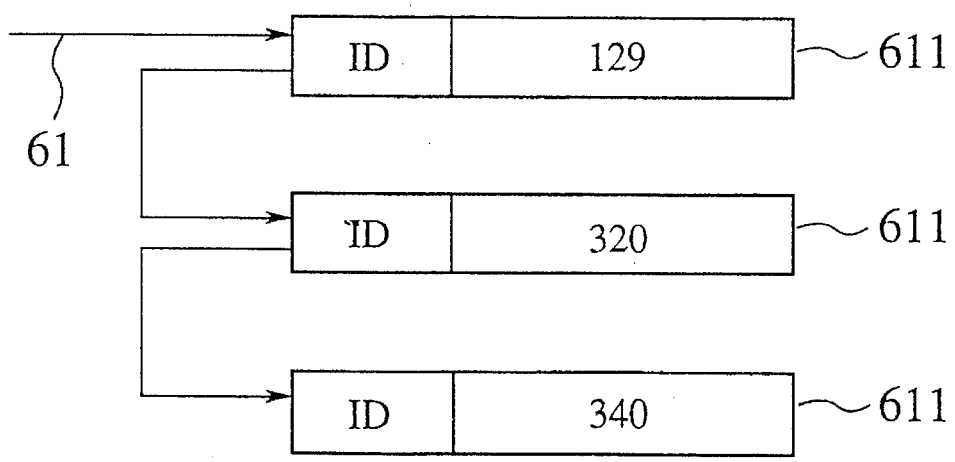
FIG. 14 is a diagram of an exemplary initial setting of the traverse ID list for another user (member) in the apparatus of FIG. 7.

On the other hand, when the same operation is made by another user having an ID "129" who also belongs to the group A with the group ID: "320" as well as another group with the group ID: "340", the initial setting 61 of the traverse ID list has three traverse IDs 611 as shown in FIG. 14. In this case, at a time of object traversing for the object 204, since the traverse right for reading is not assigned to the ID "129" of this user according to the traverse right data 313 registered in the traverse right data list field 310, the traverse data does not matches with any one of the traverse IDs 611 in the traverse ID list, such that the sub-object No. 1 of the object 204 is not going to be traversed. Consequently, the object 204 is going to be presented to this user as if it includes only one sub-object 201 for the directory itself.

Figure 15:
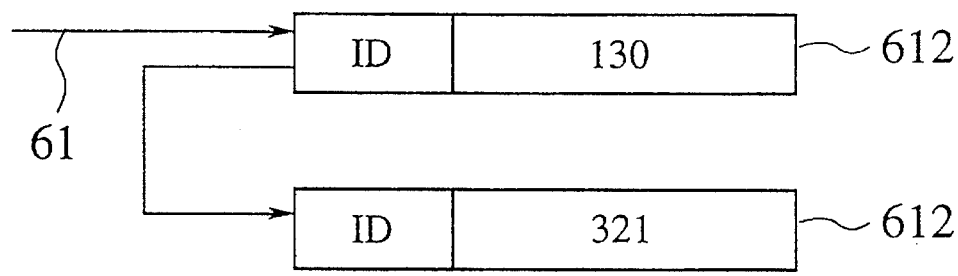
FIG. 15 is a diagram of an exemplary initial setting of the traverse ID list for still another user (non-member) in the apparatus of FIG. 7.

In contrast, when the same operation is made by the non-member of the group A who has an ID "130" and belongs to another group with the group ID "321", the initial setting 61 of the traverse ID list has two traverse IDs 612 as shown in FIG. 15. In this case, at a time of object traversing for the object 204, both of the sub-objects Nos. 1 and 2 are not going to be traversed as there is no traverse right assigned to these IDs "130" and "321". Consequently, the object 204 is going to be presented to this user as if it is an empty file without a content.

Here, if the data of the object 204 is modified such that the traverse right is assigned to this user with the ID "130" as well while no access right is assigned to this user, the object traversing is going to be carried out but the error is causes as the access right is not assigned.

Now, it is to be noted here that the above described procedure for the object traversing can be carried out recurrently as follows.

Namely, as the user with the ID: "128" tries to make an access to the object 210 first, this ID: "128" is registered in the access right data list field 303 of this object 210 as shown in FIG. 10 so that this object 210 is accessible, and according to the data of this object shown in FIG. 9, it can be recognized that there are three sub-objects for this object 210.

Then, as whether each of these sub-objects of the object 210 is traversable or not is checked sequentially, it can be recognized that only the sub-object No. 1 with the traverse right data list enlisting the group ID: "320" of the group A to which this user belongs is traversable, so that this sub-object No. 1 which is the object 204 is going to be traversed next. Hereafter, the procedure already described above for the object traversing of the object 204 can be carried out.

In this manner, the user with the ID: "128" can obtain the group A directory itself and the comments for this group A directory together as an uninterrupted data by making an access to the object 210, Similarly, as the user with the ID: "129" tries to make an access to the object 210 first, it can be similarly recognized that only the sub-object No. 1 with the traverse right data list enlisting the group ID: "320" of the group A to which this user belongs is traversable among the three sub-objects of the object 210, so that this sub-object No. which is the object 204 is going to be traversed next. Hereafter, the procedure already described above for the object traversing of the object 204 can be carried out.

Figure 16:
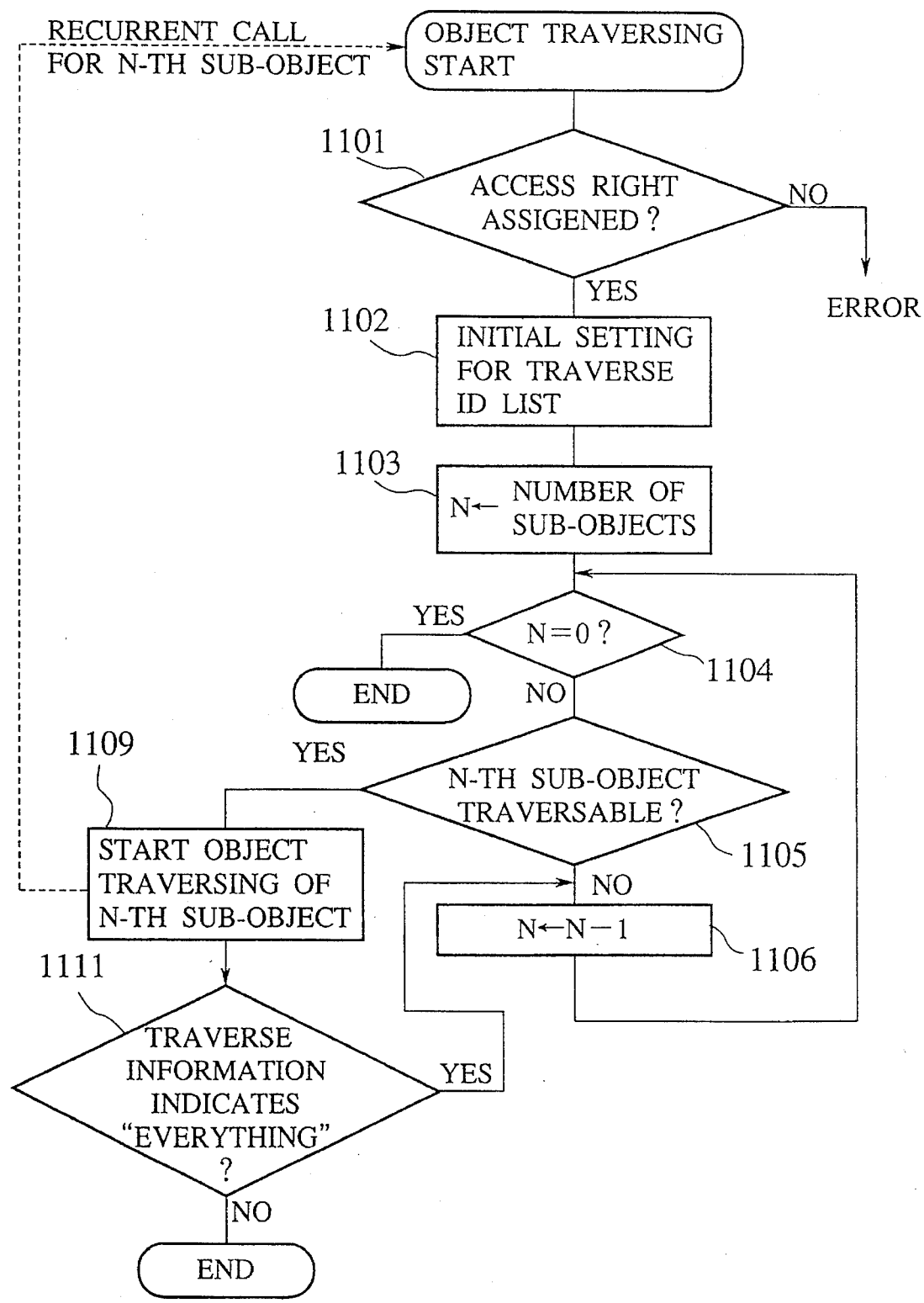
FIG. 16 is a flow chart of an operation for selecting sub-objects to be traversed in the apparatus of FIG. 7.

Thus, in this first embodiment, the process for selecting the sub-object to be traversed recurrently can be carried out according to the flow chart of FIG. 16 as follows.

Namely, as the object traversing for a certain object is started by a certain user, first at the step 1101, whether the access right for this object has been assigned to this user or not is determined. If not, the error 1s caused, whereas otherwise next at the step 1102, the initial setting 61 of the traverse ID list is made in a manner described above.

Then, a number of sub-objects of this object is set to a variable number N at the step 1103, and whether this number N is equal to zero or not is determined at the step 1104. If this number N is equal to zero, there is no sub-object to traverse further, so that the process terminates. Otherwise next at the step 1105, whether an N-th sub-object is traversable for this user or not is judged by checking the traverse right data list of the N-th sub-object. If this N-th sub-object is not traversable, the variable number N is updated to N−1, and the process returns to the step 1104 described above.

Otherwise next at the step 1109, the object traversing of this N-th sub-object is started. At this point, if this N-th sub-object contains further sub-objects for itself, the recurrent call for this N-th sub-object is made and the process returns to the start to repeat this operation of FIG. 16 for the N-th sub-object recurrently.

After the object traversing of this N-th sub-object is finished, whether the traverse Information field 307 in the data for this object indicates the flag "EVERYTHING" or not is determined at the step 1111. If not, the process terminates, whereas otherwise the process returns to the step 1106 described above.

As described, according to this first embodiment, it becomes possible to realize the flexible representations of the objects which cannot be realized by the conventional access rights alone, by providing a mechanism for selectively reading out only the necessary objects according to the judgement concerning which objects are to be traversed at a time of making an access by utilizing the traverse right data list provided for each object.

Moreover, the traverse procedure is specified in each object itself without requiring a special definition in individual application program, so that the flexible representations of the objects can be utilized in a very natural fashion from each application program.

As a consequence, this object traversing scheme of the first embodiment is suitable for the development of a new type of program in which the access rights of the objects as well as the appearances of the objects from the users must be specified in complicated manners, such as a program required by the cooperative operation support system that has become popular in recent years.

Furthermore, it is also possible in this first embodiment to resolve the conventional problem arising from the fact that, when the different access rights are set up different objects forming a single combined object, the operation of the program is going to be changed from one thread to another, and this irregularity of the program operation make it very difficult to carry out the debugging.

Thus, according to this first embodiment, it becomes possible to provide an object traversing scheme in which the object traversing procedure and the traverse rights can be specified flexibly for each object produced by a general user, independently from the operation of the application program, by utilizing the functionally different access rights and the traverse rights judiciously.

Referring now to FIG. 17, the second embodiment of the method and the apparatus for object traversing according to the present invention will be described in detail.

in this second embodiment, the object traversing apparatus has an overall configuration as shown in FIG. 17, where those elements which are equivalent to the corresponding elements in the first embodiment of FIG. 7 are given the same reference numerals in the figure and their descriptions are omitted.

This configuration of FIG. 17 for the second embodiment differs from that of FIG. 7 for the first embodiment in that the object reading execution unit10 further incorporates a traverse ID list changing unit 21 for dynamically changing the traverse ID list, which is connected between the traverse object selection unit 19 and the traverse ID list memory unit 12. More specifically, this traverse ID list changing unit 21 either adds or deletes the traverse ID in the traverse ID list stored in the traverse ID list memory unit 12 according to the selection of the sub-object to be traversed made by the traverse object selection unit 19.

Here, in addition to the function described above for the first embodiment, the traverse object selection unit 19 also functions to judge the access right for accessing the traversed object while traversing the object, and commands the traverse ID list changing unit 21 to change the traverse ID list such that the access to the traverse object can be made with an appropriate access right.

This operation of the second embodiment will now be described in further detail using a concrete example.

Consider a case of traversing the object 210 for the group directory in general and suppose that the user with the ID: "128" belongs to the group A with the group ID: "320" as well as to another group with the group ID: "340" just as in an example used in the first embodiment above. Then, the initial setting 61 of the traverse ID list has three traverse IDs 611 shown in FIG. 13 as described above.

In this case, there are three sub-objects for this object 210, and according to the traverse right data list 310 for these three sub-objects, it can be recognized that only the sub-object No. 1 with the traverse right data list enlisting the group ID: "320" of the group A to which this user belongs is traversable, so that only this sub-object No. 1 which is the object 204 is going to be traversed.

Here, for the object traversing of this sub-object No. 1, the traverse right data list defines the traverse right only for the ID: "320", so that the traverse IDs other than this ID "320" in the traverse ID list are unnecessary. Consequently, the traverse ID list changing unit 21 deletes these unnecessary traverse IDs from the traverse ID list at a time of traversing this sub-object No. 1.

Figure 18:
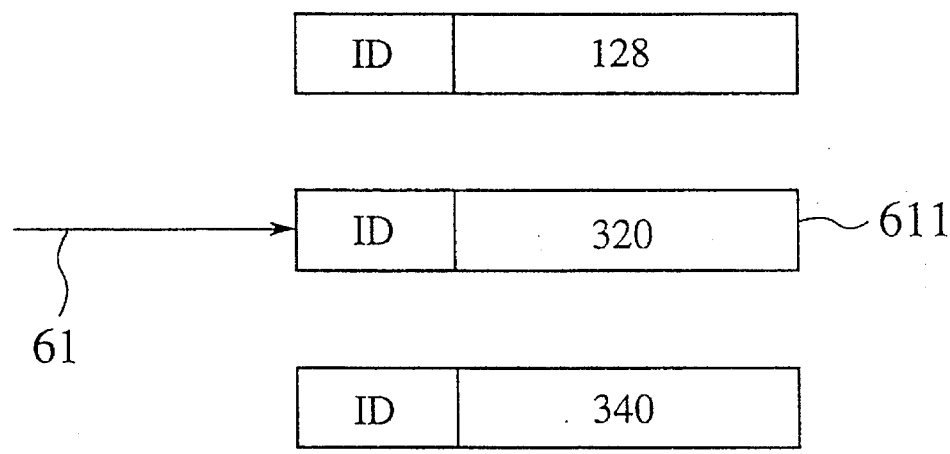
FIG. 18 is a diagram of an exemplary changed setting of the traverse ID list for one user (creator) in the apparatus of FIG. 17.

Therefore, the traverse ID list of FIG. 13 is going to be changed to a state shown in FIG. 18 in which the traverse IDs "128" and "340" are disconnected to leave only the traverse ID "320" as an active one. In other words, in accordance with the indication from the traverse right data list 310 that this sub-object No. 1 should be accessed under the access right for the ID: "320" (group A), the traverse ID list is changed to set only this ID: "320" as a proper traverse ID so as to suppress a stronger traverse right corresponding to the access right assigned to the ID: "128".

Then, the object traversing of the sub-object No. 1 which is the object 204 for the group A directory is going to be carried out according to the data for this object 204 as shown in FIG. 12.

In this case, the traverse right data list 310 of the sub-object No. 1 defines the traverse right 313 for the ID: "128" which is the ID of the current user, but since the current traverse ID list does not have this ID: "128" active as a result of the changing described above, so that the traversing of this sub-object No. 1 which is the object 202 for the comments is not going to be carried out.

On the other hand, the traverse right data list 313 of the sub-object No. 2 defines the traverse right for the ID: "320" which is also active in the current traverse ID list, so that the traversing of this sub-object No. 2 which is the object 201 for the directory itself is going to be carried out.

Thus, in this second embodiment, the user with the ID "128" (creator) can read out the content of only the object 201 for the directory itself by making an access to the object 210 for the group directory in general, without reading out the content of the object 202 for the comments under the stronger traverse rights originally assigned to this user. This is in contrast to the conventional case in which both of the objects 201 and 202 are always traversed as this user has the access rights for both of these objects, unless some special right for accessing the objects is defined on the program side. Consequently, this second embodiment can be utilized by this user conveniently in a case of printing the directory by using a program unaware of the presence of the comments.

The operations for the other users are substantially the same as in the first embodiment described above.

Figure 19:
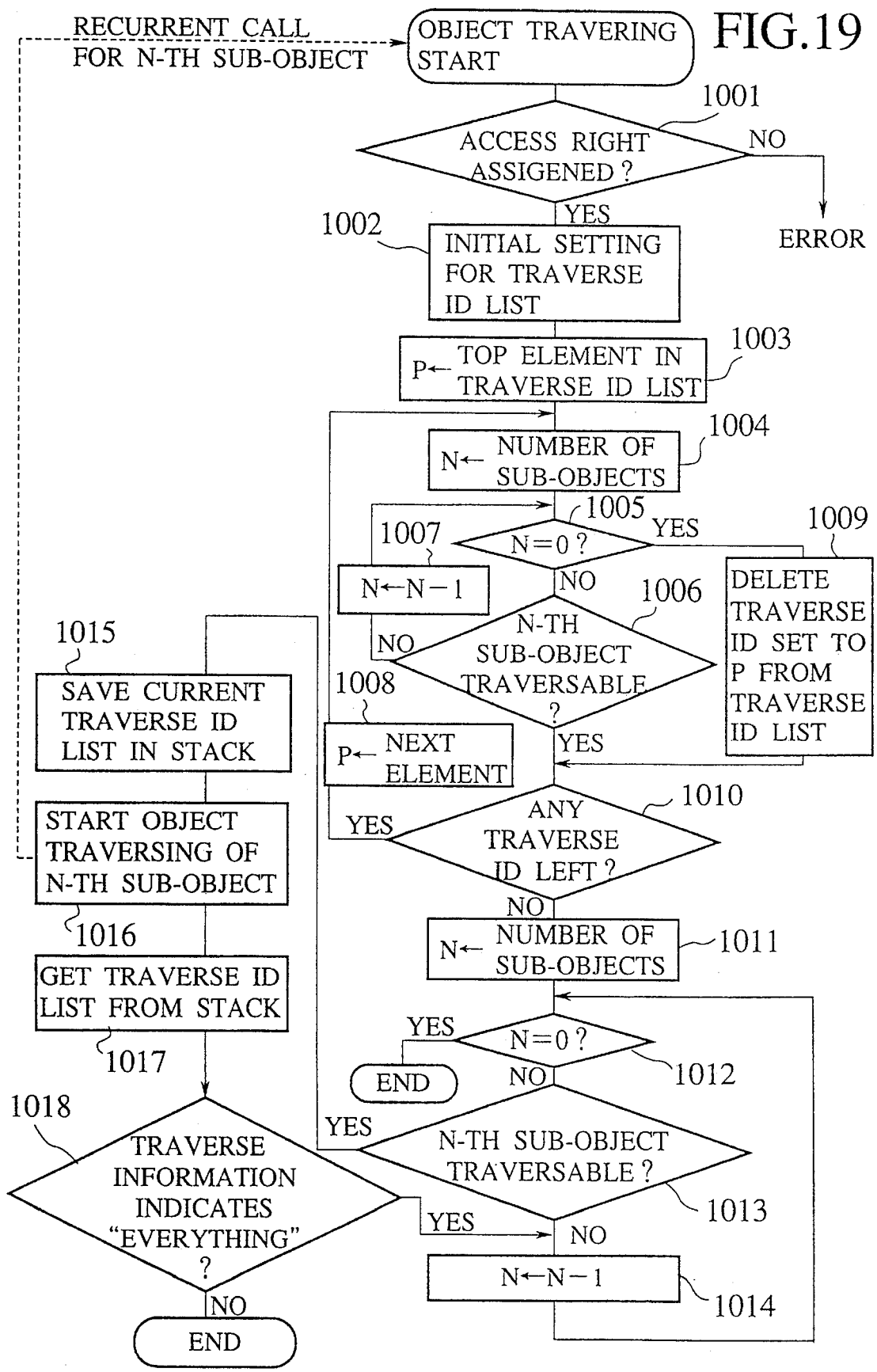
FIG. 19 is a flow chart of an operation for selecting sub-objects to be traversed and changing traverse ID list in the apparatus of FIG. 17 in one situation.
Figure 20:
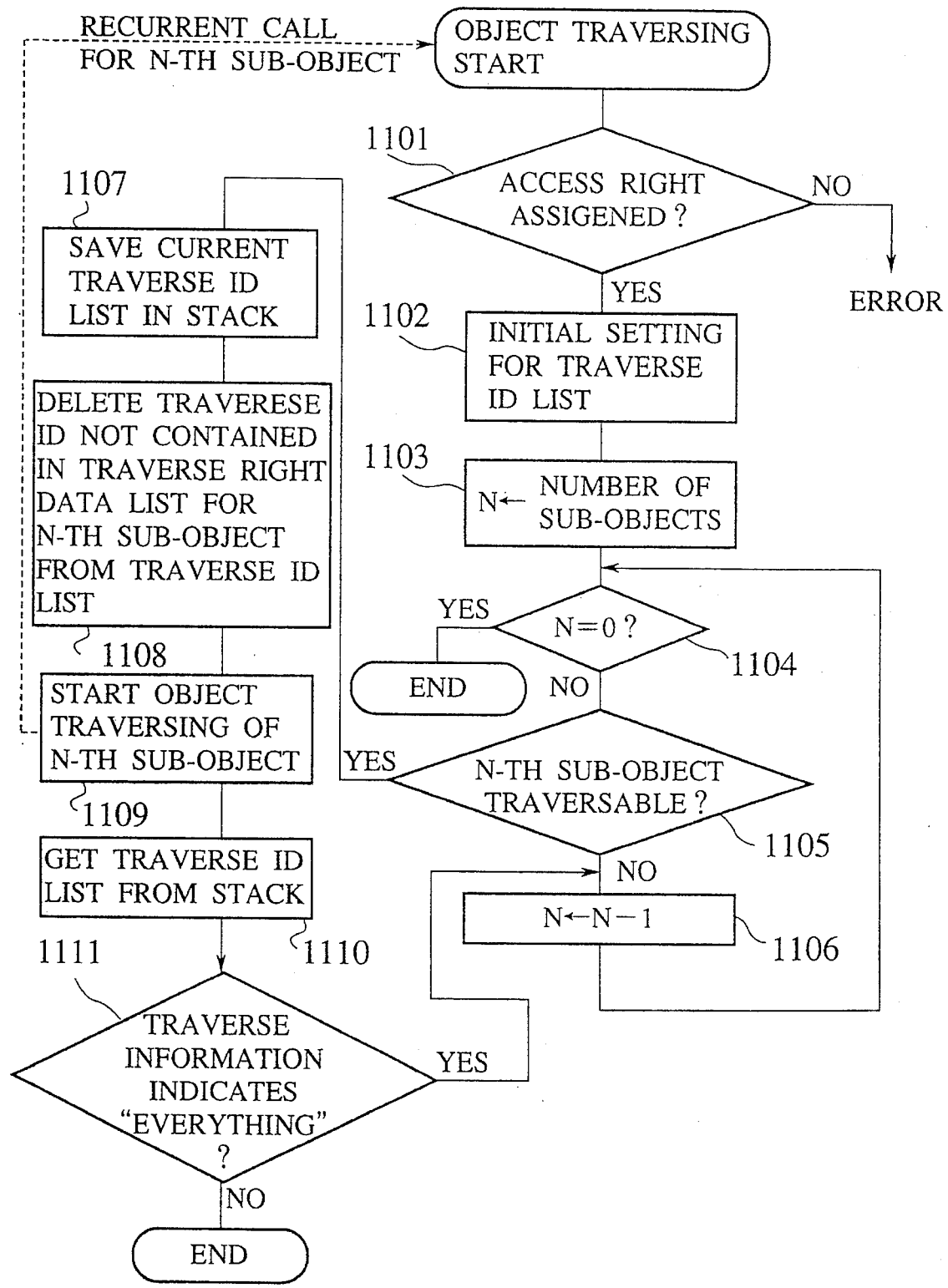
FIG. 20 is a flow chart of an operation for selecting sub-objects to be traversed and changing traverse ID list in the apparatus of FIG. 17 in another situation.

In this second embodiment, the process for selecting the sub-object to be traversed and changing the traverse ID list can be carried out according to the flow charts of FIGS. 19 and 20 as follows.

Namely, in a case of changing the traverse ID list to delete the traverse ID which has no traverse right for any of the sub-objects of the object to be currently traversed can be carried out according to the flow chart of FIG. 19 as follows.

In this case, as the object traversing for a certain object is started by a certain user, first at the step 1001, whether the access right for this object has been assigned to this user or not is determined. If not, the error is caused, whereas otherwise next at the step 1002, the initial setting 61 of the traverse ID list is made in a manner described above.

Then, a top element in the current traverse ID list is set to a pointer P at the step 1003, a number of sub-objects of this object is set to a variable number N at the step 1004, and whether this number N is equal to zero or not is determined at the step 1005. If this number N is equal to zero, there is no sub-object that can be traversed by the traverse ID set to the pointer P, so that the this traverse ID is deleted from the traverse ID list at the step 1009, and the process proceeds to the step 1010 next.

Otherwise next at the step 1006, whether an N-th sub-object is traversable for this user or not is judged by checking the traverse right data 11st of the N-th sub-object. If this N-th sub-object is not traversable, the variable number N is updated to N−1 at the step 1007, and the process returns to the step 1005 described above.

Otherwise next at the step 1010, whether any other traverse ID is left in the traverse ID list or not is determined. If there is another traverse ID in the traverse ID list, the next element in the current traverse ID list is set to the pointer P at the step 1008 and the process returns to the step 1004 described above, whereas otherwise the process proceeds to the step 1011.

At the step 1011, a number of sub-objects of this object is set to a variable number N again, and whether this number N is equal to zero or not is determined at the step 1012. If this number N is equal to zero, there is no sub-object to traverse further, so that the process terminates.

Otherwise next at the step 1013, whether an N-th sub-object is traversable for this user or not is judged by checking the traverse right data list of the N-th sub-object. If this N-th sub-object is not traversable, the variable number N is updated to N−1 at the step 1014, and the process returns to the step 1012 described above.

Otherwise, the current traverse ID list is saved in a stack at the step 1015, and the object traversing of this N-th sub-object Is started at the step 1016. At this point, if this N-th sub-object contains further sub-objects for itself, the recurrent call for this N-th sub-object is made and the process returns to the start to repeat this operation of FIG. 19 for the N-th sub-object recurrently.

After the object traversing of this N-th sub-object is finished, next at the step 1017, the saved traverse ID list is taken out from the stack, and then at the step 1018, whether the traverse information field 307 in the data for this object indicates the flag "EVERYTHING" or not is determined. If not, the process terminates, whereas otherwise the process returns to the step 1014 described above.

On the other hand, in a case of changing the traverse ID list to invalidate the traverse ID which has no traverse right for the object to be currently traversed can be carried out according to the flow chart of FIG. 20 as follows.

In this case, as the object traversing for a certain object is started by a certain user, first at the step 1101, whether the access right for this object has been assigned to this user or not is determined. If not, the error is caused, whereas otherwise next at the step 1102, the initial setting 61 of the traverse ID list is made in a manner described above.

Then, a number of sub-objects of this object is set to a variable number N at the step 1103, and whether this number N is equal to zero or not is determined at the step 1104. If this number N is equal to zero, there is no sub-object to traverse further, so that the process terminates. Otherwise next at the step 1105, whether an N-th sub-object is traversable for this user or not is judged by checking the traverse right data list of the N-th sub-object. If this N-th sub-object is not traversable, the variable number N is updated to N−1, and the process returns to the step 1104 described above.

Otherwise, the current traverse ID list is saved in a stack at the step 1107, and the traverse ID not contained in the traverse right data list for this N-th sub-object is deleted from the traverse ID list in the stack at the step 1108. Then, the object traversing of this N-th sub-object is started at the step 1109. At this point, if this N-th sub-object contains further sub-objects for itself, the recurrent call for this N-th sub-object is made and the process returns to the start to repeat this operation of FIG. 20 for the N-th sub-object recurrently.

After the object traversing of this N-th sub-object is finished, the saved traverse ID list is taken out from the stack at the step 1110, and whether the traverse information field 307 in the data for this object indicates the flag "EVERYTHING" or not is determined at the step 1111. If not, the process terminates, whereas otherwise the process returns to the step 1106 described above.

Thus, in this second embodiment, the user with the ID: "128" can traverse all the sub-objects of the object 204 by making an access to this object 204 explicitly to utilize the full traverse rights assigned to this user as in the first embodiment described above, while this user can also make an access to this object 204 by the traverse right assigned to the group ID: "320" by simply making an access to the object 210 for the group directory in general as the traverse right is changed at a time of traversing the sub-object 204 of this object 210.

Consequently, at a time of executing a directory formatting program with respect to the directory file created by himself, it becomes possible to prevent the erroneous operation of the program due to the unexpected inclusion of data for the comments along the data for the directory itself.

In other words, in this second embodiment, with respect to the data constructed from a plurality of objects, not just the access rights but also the object traversing procedure can be defined for each object separately, while it is also possible to select the objects to be traverse appropriately and changing the traverse ID list according to this selection, so that the object traversing procedure can be defined flexibly and the protection of the objects can be achieved easily.

Namely, at a time of traversing a plurality of objects by regarding them as a single file, the object traversing is carried out for all these objects under the uniform traverse right, rather than the traverse right resulting from a combination of the separate traverse rights of these objects, so that it becomes possible to prevent the occurrence of the object traversing procedure unintended by the creator of these objects.

Also, at a time of selecting the objects to be traversed, by the operation of the traverse ID list changing unit 21, it becomes possible to specify a special object traversing procedure only for a case of traversing a specific object.

Here, it is also possible to use the traverse rights in places of the usual access rights by setting a limitation that the ID not belonging to the creator of the object cannot be added to the traverse ID list at a time of changing the traverse ID list, while preventing the improper access to the object by abusing the special object traversing procedure.

Also, at a time of changing the traverse ID list, it becomes possible to provide even more flexible object traversing scheme by relaxing the above limitation to allow the addition of the traverse ID specified by a specific execution program.

Figure 21:
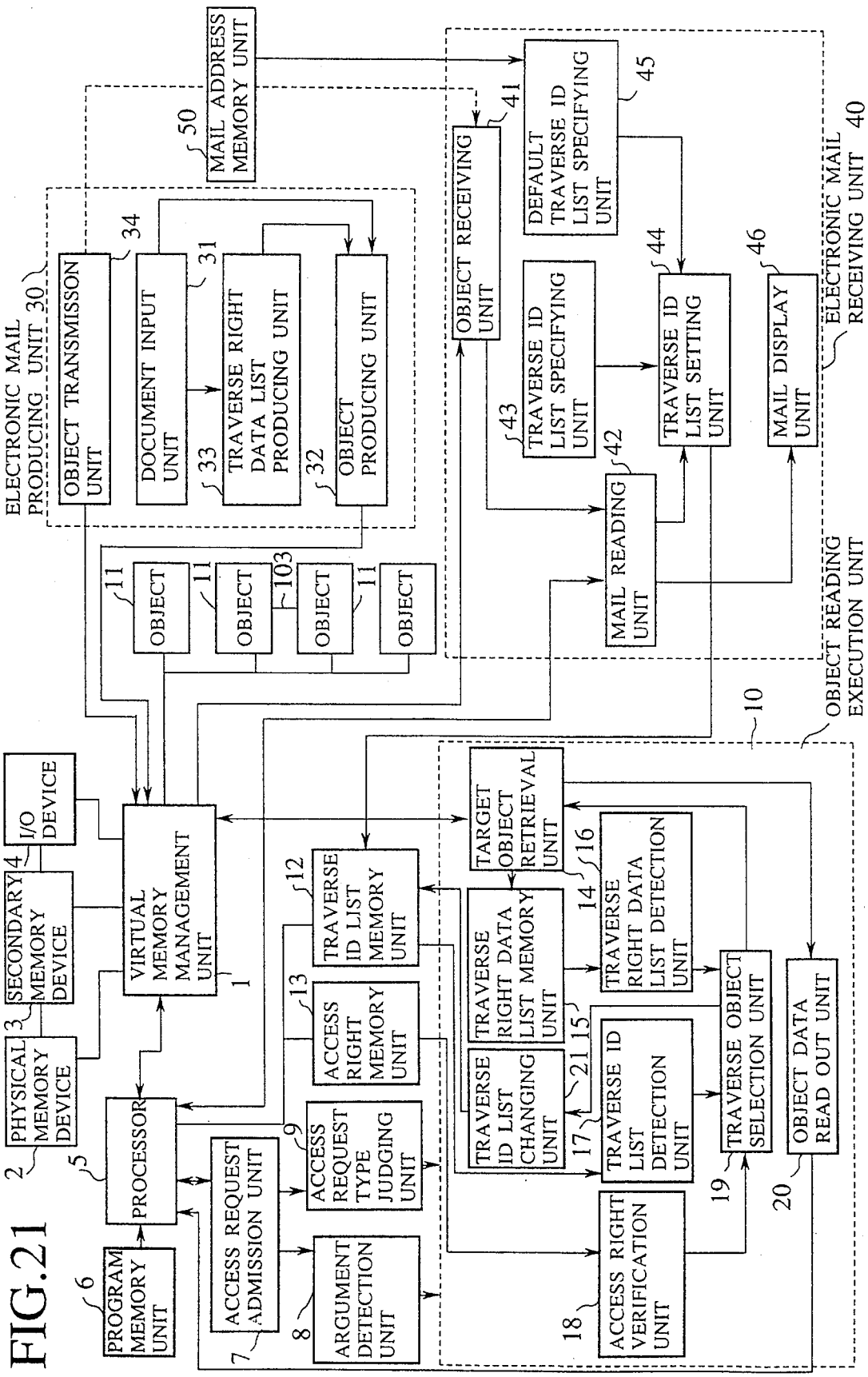
FIG. 21 is a block diagram of a third embodiment of an object traversing apparatus incorporating an electronic mail tool according to the present invention.

Referring now to FIG. 21, the third embodiment of the method and the apparatus for object traversing according to the present invention concerning the application to the electronic mail tool will be described in detail.

In this third embodiment, the object traversing apparatus incorporating the electronic mail tool has an overall configuration as shown in FIG. 21, where those elements which are equivalent to the corresponding elements in the second embodiment of FIG. 17 are given the same reference numerals in the figure and their descriptions are omitted.

The electronic mail tool portion comprises an electronic mail producing unit 30 to be used at a time of producing and transmitting an electronic mail, and an electronic mail receiving unit 40 to be used at a time of receiving and reading an electronic mail.

The electronic mail producing unit 30 includes a document input unit 31 for entering a document for making up a content of an electronic mail to be transmitted, and an object producing unit 32 for receiving the document entered at the document input unit 31 and requesting the virtual memory management unit 32 to store the received document in a form of a document object. Here, in addition to a usual text written in letters, the document may be given in general data forms such as images, speeches, database, etc. In other words, the electronic mail of this third embodiment is not necessarily limited to the conventionally known mail, and can be any desired data in general which are to be transmitted from one person to another. For example, in the electronic conference environment, the presentation documents as well as video data of the conference room can be included within the electronic mail of this third embodiment.

The electronic mail producing unit 30 also includes a traverse right data list producing unit 33 for receiving desired traverse rights to a part or a whole of the documents entered at the document input unit 31 in accordance with commands entered by a user at the document input unit 31, and requesting the object producing unit 32 to set up the desired traverse rights accordingly. This operation to set up the traverse rights usually includes the division of the object into sub-objects.

The electronic mail producing unit 30 further includes an object transmission unit 34 for transmitting the document object produced by this electronic mail producing unit 30 and stored by the virtual memory management unit 1 by specifying a mail address 50 of an intended receiver. Here, the transmission of the mail is notified to the intended receiver, or a data transmission to the other computer is carried out through a network if necessary in accordance with the mail address 50 of the intended receiver. This operation of the object transmission unit 34 can be realized by a conventionally known program called "sendmail".

The electronic mail so produced in this electronic mail producing unit 30 can be read by the others according to the appropriate traverse rights and access rights set up to it, but in this third embodiment, the electronic mail is going to be transmitted from a sender to a receiver as in a conventional electronic mail tool.

On the other hand, the electronic mail receiving unit 40 includes an object receiving unit 41 for detecting an arrival of the electronic mail, and a mail reading unit 42 for commanding the processor 5 to read the document object of the received electronic mail when the object receiving unit 41 detects the arriving electronic mail. Here, the reading of the document object can be carried out by the object reading execution unit 10 similarly as described for the second embodiment above.

The electronic mail receiving unit 40 also includes a traverse ID list specifying unit 43 for specifying the traverse ID list to be used at a time of reading the received electronic mail according to the commands entered by a user who wishes to read the received electronic mail, and a traverse ID list setting unit 44 for writing the traverse ID list specified at the traverse ID list specifying unit 43 into the traverse 1D list memory unit 12.

In this third embodiment, the traverse ID list only indicates under whose traverse right should this mail be read, and obviously a user cannot read any mail (such as those addressed to the others) for which an access right is not assigned.

The electronic mail receiving unit 40 further includes a default traverse ID list specifying unit 45 for specifying the default traverse ID list according to a current situation to the traverse ID list setting unit 44, so as to omit a possibly tedious operation to specify the traverse ID list at the traverse ID list specifying unit 43 every time the user wishes to read the received electronic mail. Here, the default traverse ID list is determined according to the mail address 50 transmitted from the object transmission unit 34 to the object receiving unit 41, although it may be specified by using an environment setting file to be customizable. For example, in a case the electronic mail is addressed to all the members of the group A, the default traverse ID list enlists the traverse ID for the members of the group A alone. The user can enter the commands for changing the setting of the default traverse ID list to this default traverse ID list specifying unit 45 according to the user's preference or the need.

The electronic mail receiving unit 40 further includes a mail display unit 46 for displaying the electronic mail read out by the processor 5 and transmitted through the mail reading unit 42. It is also possible to request the change of the traverse ID list to the traverse ID list specifying unit 43 after reading the mail at this mail display unit 46 under a certain traverse right, and then read the same mail again under a different traverse right if possible.

Now, the operation and the data structure in this third embodiment will be described in derail using a concrete example.

Figure 22:
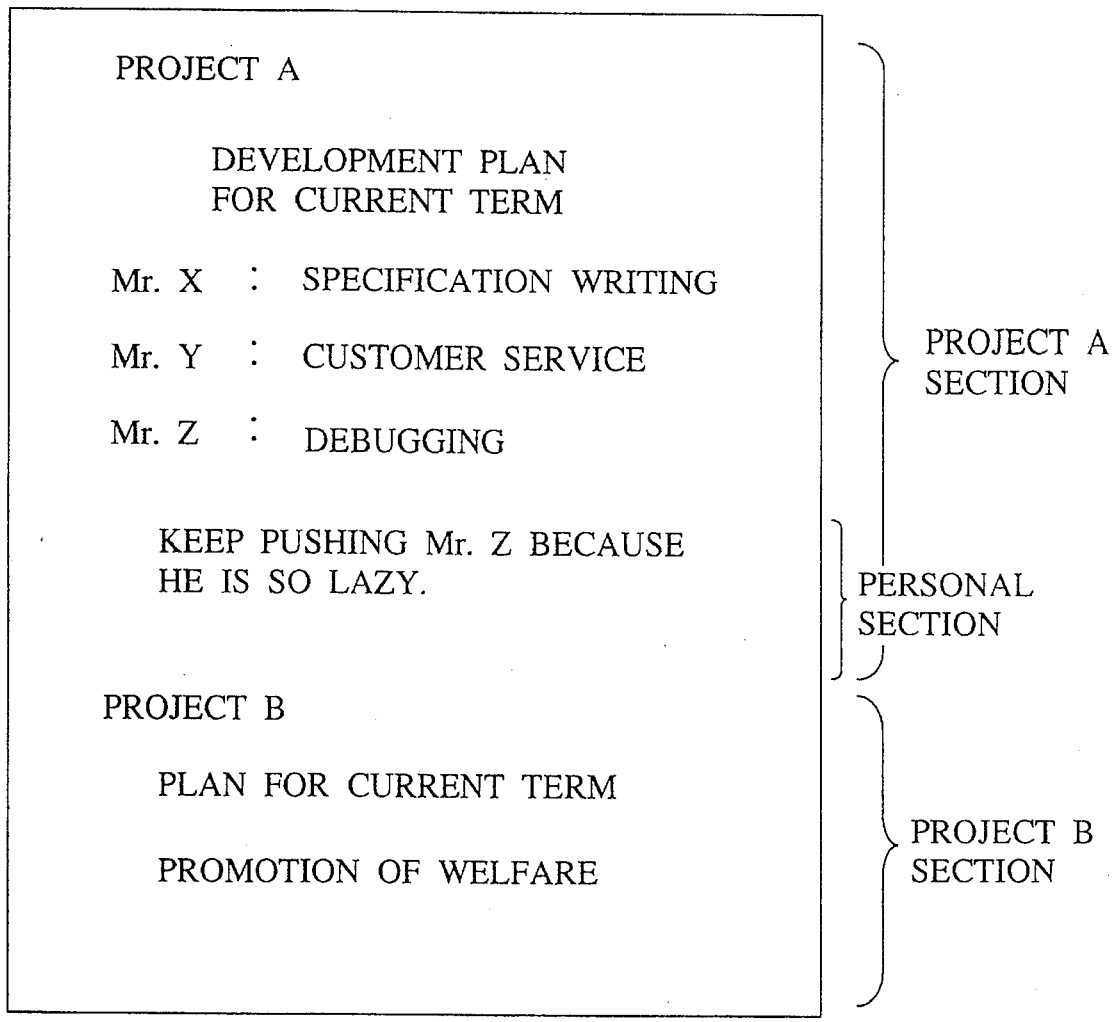
FIG. 22 is an illustration of a document to be handled as a mail in the apparatus of FIG. 21.

In this example, it is supposed that a leader of a certain group produced a document 100 as shown in FIG. 22 which contains plans for the current term about the project A and the project B. Here, it is possible to attach attributes concerning the traverse rights to the produced document, as indicated on a right margin of the document 100 itself. Usually, there is no absolute need to specify a particular traverse right to the produced document, but in this case, it is supposed that the leader intended this document 100 to be a classified one, and wished to disclose the plan of each project only to those participating in each project. Thus, In FIG. 22, the upper half concerning the project A is designated as a project A section for which the traverse right is to be assigned to the participants of the project A alone, while the lower half concerning the project B Is designated as a project B section for which the traverse right is to be assigned to the participants of the project B alone. In addition, the comment at the end of the project A section is specifically designated as a personal section for which the traverse right is to be assigned to the leader alone, as the content of this section relates to the privacy of the individual person.

Figure 23:
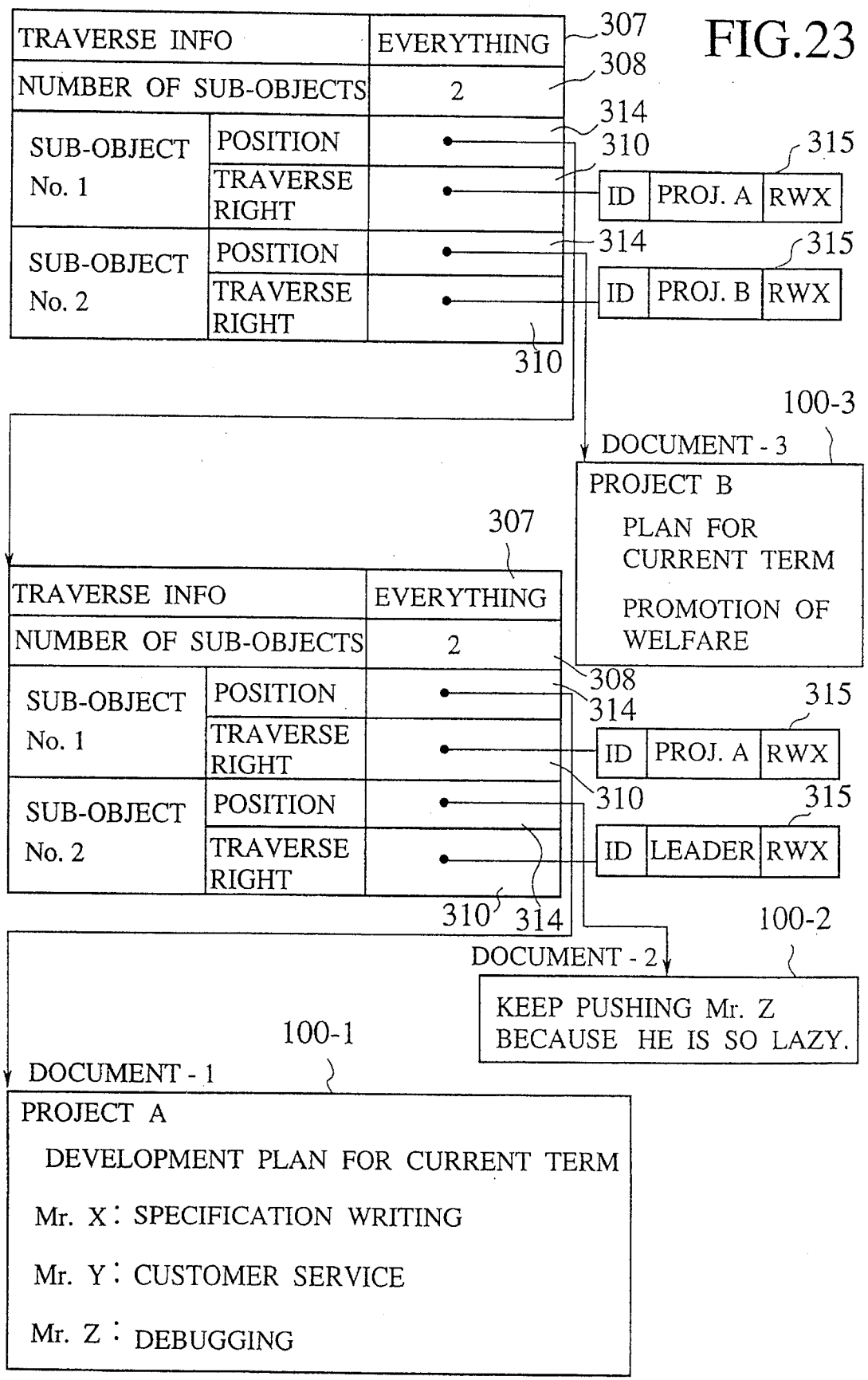
FIG. 23 is a diagram of a data structure for the object representing the document of FIG. 22 in the apparatus of FIG. 21.

In accordance with these section designation, the electronic mail producing unit 30 produces the data structure shown in FIG. 23 incorporating the appropriate traverse right data lists. Here, the fields of the object data 211 and 212 similar to those used in the first and second embodiments described above but not included in FIG. 23 are omitted only because they are not directly relevant to the operation in this third embodiment, and these fields should be considered as similarly provided in the object data 211 and 212.

In this example, the leader belongs to both of the projects A and B, so that the full traverse right for the entire document 100 is given to the leader, while the traverse right for each section designated to each project is assigned only to the participant of each project as indicated by the traverse right data lists 315. In the data structure shown in FIG. 23, the document 100 is divided into three parts 100-1,100-2, and 100-3 according to the traverse right setting, and the parts 100-1 and 100-2 are regarded as sub-objects of an object 212, while this object 212 and a part 100-3 are regarded as sub-object of an object 211 for the entire document 100. Here, instead of the sub-object IDs used in the first and second embodiments described above, the object data 211 and 212 have position pointer fields 314 for registering pointers to the sub-objects.

Now, the leader sends this document 100 as an electronic mail to all the member of the group including the participants of the project A and the participants of the project B. Here, the object traversing of the document object 211 can be carried out at a time of transmitting the electronic mail from the electronic mail producing unit 30, or at a time of reading the received electronic mail at the electronic mail receiving unit 40, or both. In the following, a case of the object traversing at the electronic mail receiving unit 40 side will be described as an example.

Figure 24:
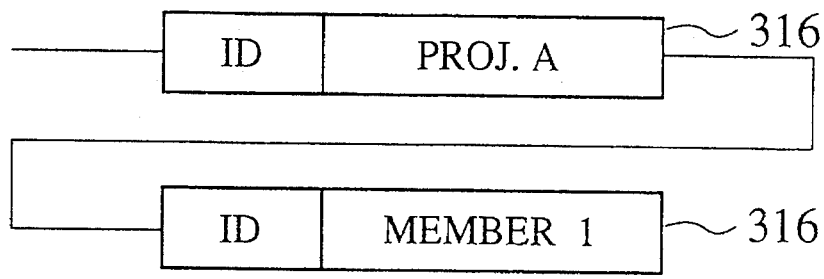
FIG. 24 is a diagram of an exemplary initial setting of the traverse ID list for one user (creator) in the apparatus of FIG. 21.

First, when this electronic mail is received by a member-1 participating only the project A, before making an access to the content of the mail, this member-1 sets up the initial setting 316 of the traverse ID list as shown in FIG. 24 which includes the ID: "PROJ.A" of the project A and the own ID: "MEMBER1". In this initial setting 316, any other IDs may also be included if desired, but such other IDs are omitted as they are irrelevant here.

Then, the object traversing of the document object 211 is carried out under the traverse right for the project A alone, so that only the document-1 part 100-1 can be accessed by the procedure similar to that in the first and second embodiments described above, such that this member-1 can read only the document-1 100-1 concerning the project A. Similarly, when a member participating only the project B receives this electronic mail, this member can read only the document-3 100-3 concerning the project B.

Figure 25:
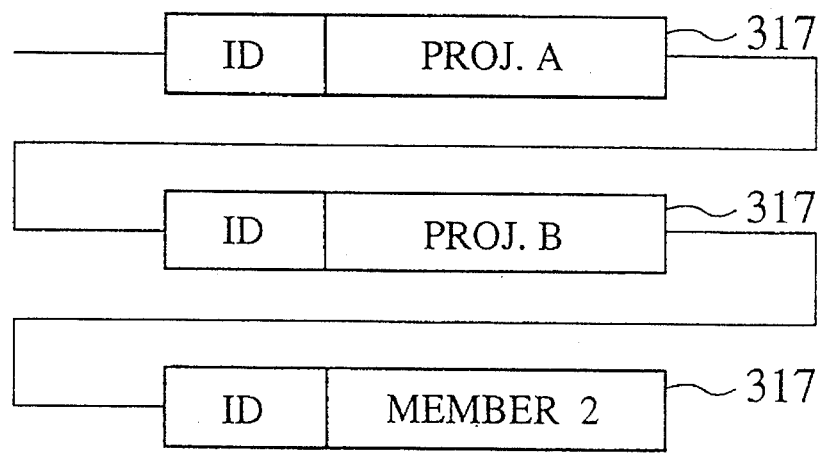
FIG. 25 is a diagram of an exemplary initial setting of the traverse ID list for another user (member) in the apparatus of FIG. 21.

On the other hand, when this electronic mail 1s received by a member-2 participating both of the project A and the project B, before making an access to the content of the mail, this member-2 sets up the initial setting 317 of the traverse ID list as shown in FIG. 25 which includes the ID: "PROJ.A" of the project A, the ID: "PROJ.B" of the project B, and the own ID: "MEMBER2". Then, the object traversing of the document object 211 is carried out under the traverse rights for the project A and the project B, and the traverse information field 307 has the flag "EVERYTHING" in this example, so that this member-2 can read the contents of both the document-1 100-1 concerning the project A and the document-3 100-3 concerning the project B as a single connected document.

From the point of view of the electronic mail tool, this third embodiment can provide a number of considerable merits as follows.

First, there is no need for the sender of the mail to carry out the tedious cut and paste operations on what has been originally managed as a single document in order to send only a necessary portion to each intended receiver, because once the traverse right data list is set up for the document, each intended receiver can read only a necessary portion intended to be read by this intended receiver according to the traverse right data list even when the entire document is sent to each intended receiver.

Also, there 1s no danger for sending a portion not intended to be read by a receiver by mistake even when the entire document is sent to the receiver. For example, even when the comment portion such as the document-2 100-2 related to the privacy of the individual member is contained in the transmitted mail, the receiver cannot possibly read this portion as long as the traverse right is not assigned to this receiver.

In addition, there is no danger for damaging a secrecy of the mail even when the mail is sent to a person who is not an intended receiver by mistake, since the received mail is going to appear as an empty one to his person as there is no traverse right assigned to this person.

Also, in a ease of sending two separate parts of the document to the same intended receiver, such as a case of sending document-1 100-1 and the document-3 100-3 to those members who participate both of the project A and project B in the above example, it becomes possible to avoid the problem due to the fact that it has been necessary to send these two separate parts as separate mails conventionally and it has been very inconvenient from a point of view of handling of the received mails at the receiver side.

Furthermore, in a currently developing operating system called single virtual memory, the accesses to the same object under the distributed computer environment can be made by using the same address, so that the transmission of the electronic mail in this system can be realized by simply handing the pointer to the mail object. In such an environment, the mail object data must be modified for each receiver in the conventional electronic mail tool so that an extra memory capacity is required for each mail object, but the simple handing of the pointer to the mail object also suffices for the electronic mail tool of this third embodiment, so that the performance of the system as a whole can be improved considerably.

Thus, according to this third embodiment, the efficiency and the effectiveness of the electronic mail tool can be improved considerably for even a very simple situation, and even higher effect can be expected for a case of dealing with a complicated object combining a number of objects.

It is to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An object traversing apparatus for traversing an object formed by a plurality of sub-objects, comprising:

memory means for storing the object with an assignment of a traverse right for each sub-object indicating who is allowed to traverse each sub-object;

traverse ID list means for specifying one or more traverse IDs for identifying a user making an access request to the object;

traverse object selection means for selecting the sub-objects to be traversed at a time of traversing the object in response to the request from the user according to the traverse right assigned to the user identified by the traverse IDs; and output means for outputting the sub-objects selected by the traverse object selection means as a result of the access to the object.

2. The apparatus of claim 1, wherein the memory means stores the object as a linked object formed by a plurality of the sub-objects which are related by links.

3. The apparatus of claim 1, wherein the memory means stores the object with a traverse information indicating a procedure for traversing the sub-objects of the object.

4. The apparatus of claim 1, wherein the traverse right for each sub-object also indicates a type of an access to each sub-object in response to which the traversing of each sub-object is allowed to one who is indicated to be allowed to traverse each sub-object.

5. The apparatus of claim 1, further comprising a mail tool including:

mail producing means for producing the object as a mail by specifying the assignment of the traverse right for each sub-object, and transmitting the produced mail by specifying a mail address; and mail receiving means for receiving the mail transmitted from the mail producing means according to the mail address specified by the mail producing means, and retrieving the sub-objects outputted by the output means as a content of a received mail.

6. The apparatus of claim 1, wherein the memory means stores the object with an assignment of an access right for the object indicating who is allowed to make an access to the object, and the traverse object selection means selects the sub-objects only when the access right is assigned to the user identified by the traverse IDs.

7. The apparatus of claim 6, further comprising:

processor means for executing a program to operate on the object by making an access to the object under the access right of the user and using the sub-objects outputted by the output means as the result of the access to the object.

8. The apparatus of claim 1, further comprising traverse ID list changing means for changing the traverse IDs specified by the traverse ID list means.

9. The apparatus of claim 8, wherein the traverse ID list changing means deletes those traverse IDs specified by the traverse ID list means to which the traverse right of none of the sub-objects is assigned.

10. The apparatus of claim 8, wherein:

one of the sub-objects selected by the traverse object selection means contains at least one further sub-objects, where the memory means stores said one of the sub-object with an assignment of a traverse right for each further sub-object indicating who is allowed to traverse each further sub-object; and the traverse ID list changing means deletes those traverse IDs specified by the traverse ID list means to which the traverse right of none of the further sub-objects is assigned at a time of traversing said one of the sub-objects.

11. The apparatus of claim 1, wherein the memory means stores the object with an assignment of an access right for the object indicating who is allowed to make an access to the object, and the apparatus further comprises access right verification means for verifying the assignment of the access right to the user identified by the traverse IDs only for the sub-objects selected by the traverse object selection means.

12. The apparatus of claim 11, further comprising:

processor means for executing a program to operate on the object by making an access to the object under the access right of the user and using the sub-objects outputted by the output means as the result of the access to the object.

13. A method of object traversing for traversing an object formed by a plurality of sub-objects, comprising the steps of:

storing the object with an assignment of a traverse right for each sub-object indicating who is allowed to traverse each sub-object;

specifying one or more traverse IDs for identifying a user making an access request to the object;

selecting the sub-objects to be traversed at a time of traversing the object in response to the request from the user according to the traverse right assigned to the user identified by the traverse IDs; and outputting the sub-objects selected at the selecting step as a result of the access to the object.

14. The method of claim 13, wherein the object is stored at the storing step as a linked object formed by a plurality of the sub-objects which are related by links.

15. The method of claim 13, wherein the object is stored at the storing step with a traverse information indicating a procedure for traversing the sub-objects of the object.

16. The method of claim 13, wherein at the storing step, the traverse right for each sub-object also indicates a type of an access to each sub-object in response to which the traversing of each sub-object is allowed to one who is indicated to be allowed to traverse each sub-object.

17. The method of claim 13, further comprising the steps of:

producing the object as a mail by specifying the assignment of the traverse right for each sub-object, and transmitting the produced mail by specifying a mail address; and receiving the mail transmitted at the producing step according to the mail address specified at the producing step, and retrieving the sub-objects outputted at the outputting step as a content of a received mail.

18. The method of claim 13, wherein the object is stored at the storing step with an assignment of an access right for the object indicating who is allowed to make an access to the object, and the sub-objects are selected at the selecting step only when the access right is assigned to the user identified by the traverse IDs.

19. The method of claim 18, further comprising the step of:

executing a program to operate on the object by making an access to the object under the access right of the user and using the sub-objects outputted at the outputting step as the result of the access to the object.

20. The method of claim 13, further comprising the step of:

changing the traverse IDs specified at the specifying step.

21. The method of claim 20, wherein the changing step deletes those traverse IDs specified at the specifying step to which the traverse right of none of the sub-objects is assigned.

22. The method of claim 20, wherein:

one of the sub-objects selected at the selecting step contains at least one further sub-objects, where said one of the sub-object is stored with an assignment of a traverse right for each further sub-object indicating who is allowed to traverse each further sub-object; and the changing step deletes those traverse IDs specified at the specifying step to which the traverse right of none of the further sub-objects is assigned at a time of traversing said one of the sub-objects.

23. The method of claim 13, wherein the object is stored at the storing step with an assignment of an access right for the object indicating who is allowed to make an access to the object, and the method further comprising the step of verifying the assignment of the access right to the user identified by the traverse IDs only for the sub-objects selected at the selecting step.

24. The method of claim 23, further comprising the step of:

executing a program to operate on the object by making an access to the object under the access right of the user and using the sub-objects outputted at the outputting step as the result of the access to the object.

* * * * *